US012789459B2

(12) United States Patent
Tjellesen et al.

(10) Patent No.: US 12,789,459 B2
(45) **Date of Patent: *Nov. 10, 2026**

(54) APPARATUS FOR THE MANUFACTURE OF THREE-DIMENSIONAL OBJECTS

(71) Applicant: Stratasys Powder Production Ltd., London (GB)

(72) Inventors: Frederik Tjellesen, London (GB); Anders Hartmann, London (GB); Alexander Rasmussen, London (GB)

(73) Assignee: Stratasys Powder Production Ltd., Nottingham (GB)

(*) Notice: Subject to any disclaimer, the term of this patent is extended or adjusted under 35 U.S.C. 154(b) by 55 days.

This patent is subject to a terminal disclaimer.

(21) Appl. No.: 19/030,832

(22) Filed: Jan. 17, 2025

(65) Prior Publication Data

US 2025/0242543 A1 Jul. 31, 2025

Related U.S. Application Data

(63) Continuation of application No. 18/453,794, filed on Aug. 22, 2023, now Pat. No. 12,304,146, which is a (Continued)

(30) Foreign Application Priority Data

Nov. 17, 2017 (GB) ..................................... 1719096

(51) Int. Cl.

*B29C 64/307* (2017.01)
*B22F 10/73* (2021.01)

(Continued)

(52) U.S. Cl.

CPC ............ *B29C 64/307* (2017.08); *B22F 10/73* (2021.01); *B22F 12/50* (2021.01); *B29C 64/153* (2017.08);

(Continued)

(58) Field of Classification Search

CPC ......... B29C 64/357; B22F 10/70; B22F 10/73

See application file for complete search history.

(56) References Cited

U.S. PATENT DOCUMENTS

| | | |
|---|---|---|
| 7,887,316 B2 | 2/2011 | Cox |
| 9,254,535 B2 | 2/2016 | Buller et al. |

(Continued)

FOREIGN PATENT DOCUMENTS

| | | |
|---|---|---|
| CN | 106392069 A | 2/2017 |
| CN | 107848200 A | 3/2018 |

(Continued)

OTHER PUBLICATIONS

International Search Report and Written Opinion issued Feb. 15, 2019, in International Application No. PCT/GB2018/053336 (15 pgs.).

(Continued)

*Primary Examiner* — Timothy Kennedy

(74) *Attorney, Agent, or Firm* — HONIGMAN LLP; Eric J. Sosenko; Jonathan P. O'Brien

(57) ABSTRACT

A method for recirculating powder in an apparatus for manufacturing a three-dimensional object from the powder. The powder recirculation method includes: providing powder in a powder repository, the powder being one of fresh powder, excess powder or a blend thereof; transferring the powder from the repository to a work surface; distributing the powder across a build surface and resulting in a portion of the powder defining excess powder; returning the excess powder back to the repository; monitoring the amount of powder in the repository relative to a predetermined amount of powder; and delivering fresh powder from a powder tank to the repository when the amount of powder in the repository is less than the predetermined amount and not delivering fresh powder when excess powder is being returned to (Continued)

repository and the amount of powder in the repository is greater than the predetermined amount of powder.

17 Claims, 21 Drawing Sheets

Related U.S. Application Data continuation of application No. 16/764,924, filed as application No. PCT/GB2018/053336 on Nov. 16, 2018, now Pat. No. 11,780,167.

(51) Int. Cl.

| | |
|---|---|
| ***B22F 12/50*** | (2021.01) |
| ***B29C 64/153*** | (2017.01) |
| ***B29C 64/214*** | (2017.01) |
| ***B29C 64/245*** | (2017.01) |
| ***B29C 64/255*** | (2017.01) |
| ***B29C 64/295*** | (2017.01) |
| ***B29C 64/314*** | (2017.01) |
| ***B29C 64/321*** | (2017.01) |
| ***B29C 64/357*** | (2017.01) |
| ***B33Y 40/00*** | (2020.01) |
| *B22F 10/28* | (2021.01) |
| *B22F 12/13* | (2021.01) |
| *B22F 12/20* | (2021.01) |
| *B22F 12/57* | (2021.01) |
| *B22F 12/63* | (2021.01) |
| *B22F 12/90* | (2021.01) |
| *B29C 64/209* | (2017.01) |
| *B29C 64/227* | (2017.01) |
| *B33Y 30/00* | (2015.01) |
| *B33Y 40/10* | (2020.01) |

(52) U.S. Cl.

CPC .......... *B29C 64/214* (2017.08); *B29C 64/245* (2017.08); *B29C 64/255* (2017.08); *B29C 64/295* (2017.08); *B29C 64/314* (2017.08); *B29C 64/321* (2017.08); *B29C 64/357* (2017.08); *B33Y 40/00* (2014.12); *B22F 10/28* (2021.01); *B22F 12/13* (2021.01); *B22F 12/20* (2021.01); *B22F 12/57* (2021.01); *B22F 12/63* (2021.01); *B22F 12/90* (2021.01); *B29C 64/209* (2017.08); *B29C 64/227* (2017.08); *B33Y 30/00* (2014.12); *B33Y 40/10* (2020.01)

(56) References Cited

U.S. PATENT DOCUMENTS

| | | | |
|---|---|---|---|
| 2001/0045678 | A1 | 11/2001 | Kubo et al. |
| 2002/0090410 | A1 | 7/2002 | Tochimoto et al. |
| 2008/0241404 | A1 | 10/2008 | Allaman et al. |
| 2014/0202381 | A1 | 7/2014 | Ederer et al. |
| 2015/0034123 | A1 | 2/2015 | Pressacco et al. |
| 2015/0336330 | A1 | 11/2015 | Herzog |
| 2016/0193696 | A1 | 7/2016 | Mcfarland et al. |
| 2016/0361874 | A1 | 12/2016 | Park et al. |
| 2017/0028631 | A1 | 2/2017 | Hyatt et al. |
| 2017/0072636 | A1 | 3/2017 | Ng et al. |
| 2017/0348771 | A1 | 12/2017 | Kawada et al. |
| 2018/0021855 | A1 | 1/2018 | De Lajudie et al. |
| 2018/0264728 | A1 | 9/2018 | Manuel Grases et al. |
| 2019/0001413 | A1 | 1/2019 | Golz et al. |
| 2019/0061254 | A1 | 2/2019 | West et al. |

FOREIGN PATENT DOCUMENTS

| | | | |
|---|---|---|---|
| DE | 102015222689 | A1 | 5/2017 |
| EP | 3127636 | A1 | 2/2017 |
| FR | 2166526 | A5 | 8/1973 |
| JP | 2002205338 | A | 7/2002 |
| JP | 2017001381 | A | 1/2017 |
| JP | 2017030353 | A | 2/2017 |
| JP | 2018506651 | A | 3/2018 |
| WO | 2016131785 | A1 | 8/2016 |
| WO | 2017005301 | A1 | 1/2017 |
| WO | 2017088897 | A1 | 6/2017 |
| WO | 2017184166 | A1 | 10/2017 |
| WO | 2017194118 | A1 | 11/2017 |

OTHER PUBLICATIONS

Search Report issued May 16, 2018, in the corresponding United Kingdom Application No. 1719096.8 (2 pgs.).

APPARATUS FOR THE MANUFACTURE OF THREE-DIMENSIONAL OBJECTS

CROSS REFERENCE TO RELATED APPLICATIONS

This application is continuation of U.S. application Ser. No. 18/453,794, filed Aug. 22, 2023, which is a continuation of U.S. application Ser. No. 16/764,924, filed May 18, 2020, which is a U.S. national phase of PCT/GB2018/053336, filed Nov. 16, 2018, which claims priority to GB1719096.8, filed Nov. 17, 2017, the entire contents of which are incorporated by reference herein.

BACKGROUND OF THE INVENTION

1. Field of the Invention

The present techniques relate to apparatus for the manufacture of three-dimensional objects. More particularly, the techniques relate to a powder delivery and recirculation device for use in the apparatus for the manufacture of three-dimensional objects.

2. Related Technology

Apparatus for the manufacture of three-dimensional objects from a powder-based material using a process such as binder jet, laser sintering (LS) or high speed sintering (HSS) are known. These processes require the deposition of a layer of powder-based material. LS apparatus, which may use polymeric or metal powders, then uses a laser to trace the shape of a layer of the object in the powdered material, sintering the powdered material. Another layer of powdered material is then deposited and the shape of the next layer of the object is traced by the laser, and so on, to fabricate a three-dimensional object. A process using an electron beam may further be used to fuse metal powder.

In contrast to LS or electron beam where the energy source is required to trace the shape of the object in each layer of powdered material, a high speed sintering (HSS) or binder printing process may be used. In HSS, a radiation absorbing material (RAM) is printed in the shape of each layer of the object onto the layer of powder, typically in one pass of a printhead or row of printheads. Then each printed layer is irradiated with a radiation source, for example an infrared light, across the entire build area, such that only the powder to which the RAM has been applied is fused. In a binder jet process, a binder such as an adhesive is deposited in a defined pattern on the powder layer that may be based on polymer, ceramic or metal powder, using a printhead. The binder acts as an adhesive between the powder layers. Radiation may be used optionally to cure the binder.

All the above methods require a powder delivery and deposition system.

SUMMARY OF THE INVENTION

Aspects of the invention are set out in the appended independent claims, while details of particular embodiments are set out in the appended dependent claims.

According to one aspect, the invention provides a powder recirculation system for an apparatus for manufacturing a three-dimensional object from powder.

According to one embodiment, the delivery mechanism delivers the first excess powder from the powder recirculation path to the powder repository.

According to another embodiment, the delivery mechanism draws the powder from the powder tank when the first excess powder from the powder recirculation path falls below a predefined level.

According to another embodiment, the delivery mechanism draws the powder from the powder tank when there is no longer a sufficient amount of first excess powder from the powder recirculation path to fill the delivery path.

According to another embodiment, the delivery mechanism mixes the first excess powder from the powder recirculation path with powder from the powder tank.

According to another embodiment, the powder recirculation path is heated to a temperature equal to a temperature of the delivery path.

According to another embodiment, the powder recirculation path is configured such that the first excess powder travels along the powder recirculation path by gravitational force.

According to another embodiment, the powder recirculation system further comprises: an agitator provided in the powder recirculation path.

According to another embodiment, the powder recirculation system further comprises: a dosing blade for transferring the powder from the powder repository to a work surface comprising a build area; a device for distributing the powder provided to the work surface across the build area; and a powder return path configured to receive second excess powder following the distribution of the powder across the build area, and further configured to return the second excess powder to the delivery path at a location upstream of the outlet of the powder tank.

According to another embodiment, the delivery mechanism is configured to deliver the second excess powder from the powder return path to the powder repository.

According to another embodiment, the delivery mechanism draws the powder from the powder tank when the first excess powder from the powder recirculation path and the second excess powder from the powder return path falls below a predefined level.

According to another embodiment, the delivery mechanism draws the powder from the powder tank when there is no longer a sufficient amount of the first excess powder from the powder recirculation path or the second excess powder from the powder return path to fill the delivery path.

According to another embodiment, the delivery mechanism mixes the second excess powder from the powder return path with the first excess powder from the powder recirculation path.

According to another embodiment, delivery mechanism mixes the second excess powder from the powder return path with the first excess powder from the powder recirculation path and with the powder from the powder tank.

According to another embodiment, the powder return path is configured to return the second excess powder to the delivery path at a location below where the first excess powder from the powder recirculation path is returned to the delivery path.

According to another embodiment, the powder return path is configured to return the second excess powder to the delivery path at the same location as the first excess powder from the powder recirculation path.

According to another embodiment, the powder recirculation path is coupled to the powder return path, such that the first excess powder from the powder recirculation path and the second excess powder from the powder return path is combined prior to being returned to the delivery path at a location below the outlet of the powder tank.

According to another embodiment, the powder recirculation system further comprises: a filter provided in the powder return path.

According to another embodiment, the powder return path is heated to a temperature equal to a temperature of the delivery path.

According to another embodiment, the powder return path is configured such that the second excess powder travels along the powder return path by gravitational force.

According to another embodiment, the powder recirculation system further comprises: an agitator provided in the powder return path.

According to another embodiment, the powder recirculation system further comprises: a return slot provided to the work surface at a side of the build area opposite from the dosing blade, the return slot configured to receive the second excess powder following the distribution of the powder across the build area, and coupled to the powder return path.

According to another embodiment, wherein the dosing blade transfers a set amount of the powder at a set frequency to the work surface.

According to another embodiment, the delivery mechanism is configured to deliver the excess powder from the powder return path to the powder repository.

According to another embodiment, the delivery mechanism draws the powder from the powder tank when the excess powder from the powder return path falls below a predefined level.

According to another embodiment, the delivery mechanism draws the powder from the powder tank when there is no longer a sufficient amount of the excess from the powder return path to fill the delivery path.

According to another embodiment, the delivery mechanism mixes the excess from the powder return path with the powder from the powder tank.

According to another embodiment, the powder recirculation system further comprises: a filter provided in the powder return path.

According to another embodiment, the powder return path is heated to a temperature equal to a temperature of the delivery path.

According to another embodiment, the powder return path is configured such that the excess powder travels along powder return path by gravitational force.

According to another embodiment, the powder recirculation system further comprises: an agitator provided in the powder return path.

According to another embodiment, the powder recirculation system further comprises: a return slot provided to the work surface at a side of the build area opposite from the dosing blade, the return slot configured to receive the second excess powder following the distribution of the powder across the build area, and coupled to the powder return path.

According to another embodiment, the dosing blade transfers a set amount of the powder at a set frequency to the work surface.

According to another embodiment, the delivery path is heated to a predetermined temperature.

According to another embodiment, the outlet of the powder tank is thermally insulated from the delivery path.

According to another embodiment, the delivery mechanism comprises an auger screw.

According to another embodiment, the powder recirculation path and/or the powder return path comprises an upper section having a shallow angle of inclination, for receiving falling powder in use, coupled to a steeper lower section.

According to another aspect, the invention provides a method for recirculating powder in an apparatus for manufacturing a three-dimensional object from the powder.

Further objects, features and advantages of this invention will become readily apparent to persons skilled in the art after review of the following description, including the claims, and with reference to the drawings that are appended to and form a part of this specification.

BRIEF DESCRIPTION OF THE DRAWINGS

Embodiments will now be described with reference to the accompanying Figures of which.

DETAILED DESCRIPTION

The following disclosure describes a powder recirculation system for an apparatus for manufacturing a three-dimensional object from powder. The powder recirculation system comprises: a delivery path coupled to an outlet of a powder tank, the powder tank configured to store the powder; a powder repository coupled to an outlet of the delivery path, the delivery path comprising a delivery mechanism for delivering the powder from the powder tank to the powder repository; and a powder recirculation path coupled to an outlet of the powder repository, wherein the powder recirculation path is configured to return first excess powder from the powder repository to the delivery path at a location upstream of the outlet of the powder tank.

The following disclosure additionally describes a powder recirculation system for an apparatus for manufacturing a three-dimensional object from powder. The powder recirculation system comprises: a delivery path coupled to an outlet of a powder tank, the powder tank configured to store the powder; a powder repository coupled to an outlet of the delivery path, the delivery path comprising a delivery mechanism for delivering the powder from the powder tank to the powder repository; a dosing blade for transferring the powder from the powder repository to a work surface comprising a build area; a device for distributing the powder provided to the work surface across the build area; and a powder return path configured to receive excess powder following the distribution of the powder across the build area, and further configured to return the excess powder to the delivery path at a location below the outlet of the powder tank.

The following disclosure additionally describes an apparatus for manufacturing three-dimensional objects from build powder.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

Figure 1:
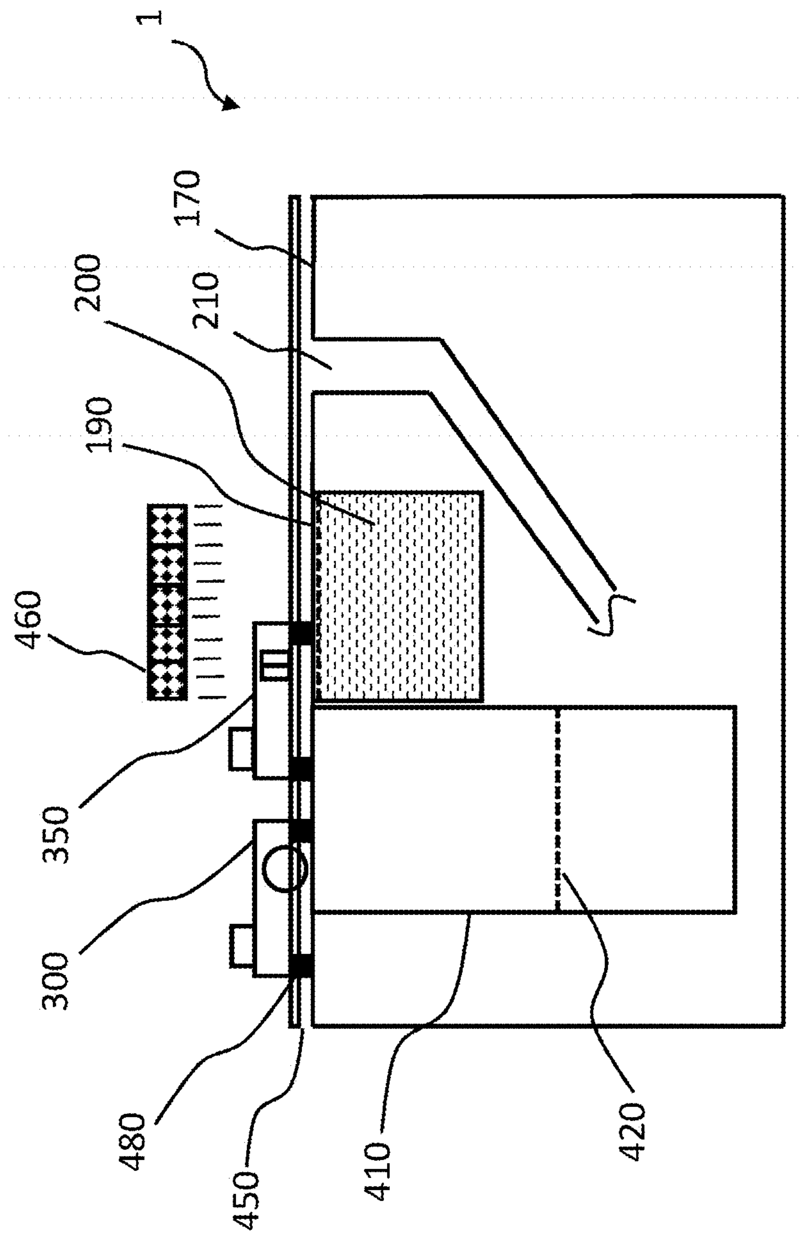
FIG. 1 schematically illustrates an apparatus for manufacture of three-dimensional object.

FIG. 1 schematically illustrates an apparatus 1 for the manufacture of three-dimensional objects, which uses high speed sintering (HSS) as a method to create three dimensional objects from a powder based material. The apparatus 1 fabricates three-dimensional objects from a build powder. The build powder may be, or may comprise, a thermoplastic polymeric material such as PA11, PA12, PA6, polypropylene (PP), polyurethane or other polymers. Some metals or ceramics may also be compatible with the apparatus dependent on the sintering temperature achievable by the radiation source of the apparatus, and whether the metal or ceramic powder does not absorb certain wavelengths.

The apparatus 1 comprises a holding tank 410 for storing the build powder. The build powder is deposited in the holding tank 410 as required. According to one embodiment, fresh "virgin" powder is deposited in the holding tank 410. Fresh powder is considered to be powder which has not been used in the apparatus 1 previously. As discussed in more detail later, according to another embodiment, excess powder which is not sintered during a cycle of the apparatus 1 may be returned to the holding tank 410 and blended with the virgin powder. A cycle of the apparatus 1 is considered to begin when a layer of powdered material is deposited in a build area. A radiation absorbing material (RAM) is then printed on the layer of powdered material and the entire build area is exposed to a radiation source to sinter the powder. Following sintering, the build area is lowered, this is considered to be the end of the cycle. When another layer of the powdered material is deposited in the build area, a next cycle of the apparatus is considered to have begun.

The apparatus 1 also comprises a powder distribution sled 300 and a printing sled 350 arranged on bearings 480 on rails 450. The rails 450 suspend the sleds 300, 350 above a work surface 170 of the apparatus 1. The work surface 170 comprises a build area 190 provided at the top of a build chamber 200. An overhead heater 460, such as a ceramic lamp, may be provided above the build area 190, and a return slot 210 may be provided to one side of the build area 190 as illustrated in FIG. 1.

As is known in the art, build powder may become compacted and consequently inhibits flow of the powder from the holding tank 410. In order to prevent this, the holding tank 410 may be provided with a stirring device 420 to keep the powder flowing freely. Any stirring mechanism may be used to keep the powder flowing freely. According to one embodiment, the powder may be continuously stirred, following introduction to the holding tank 410. According to another embodiment, the powder may be periodically stirred, following introduction to the holding tank 410

Figure 2:
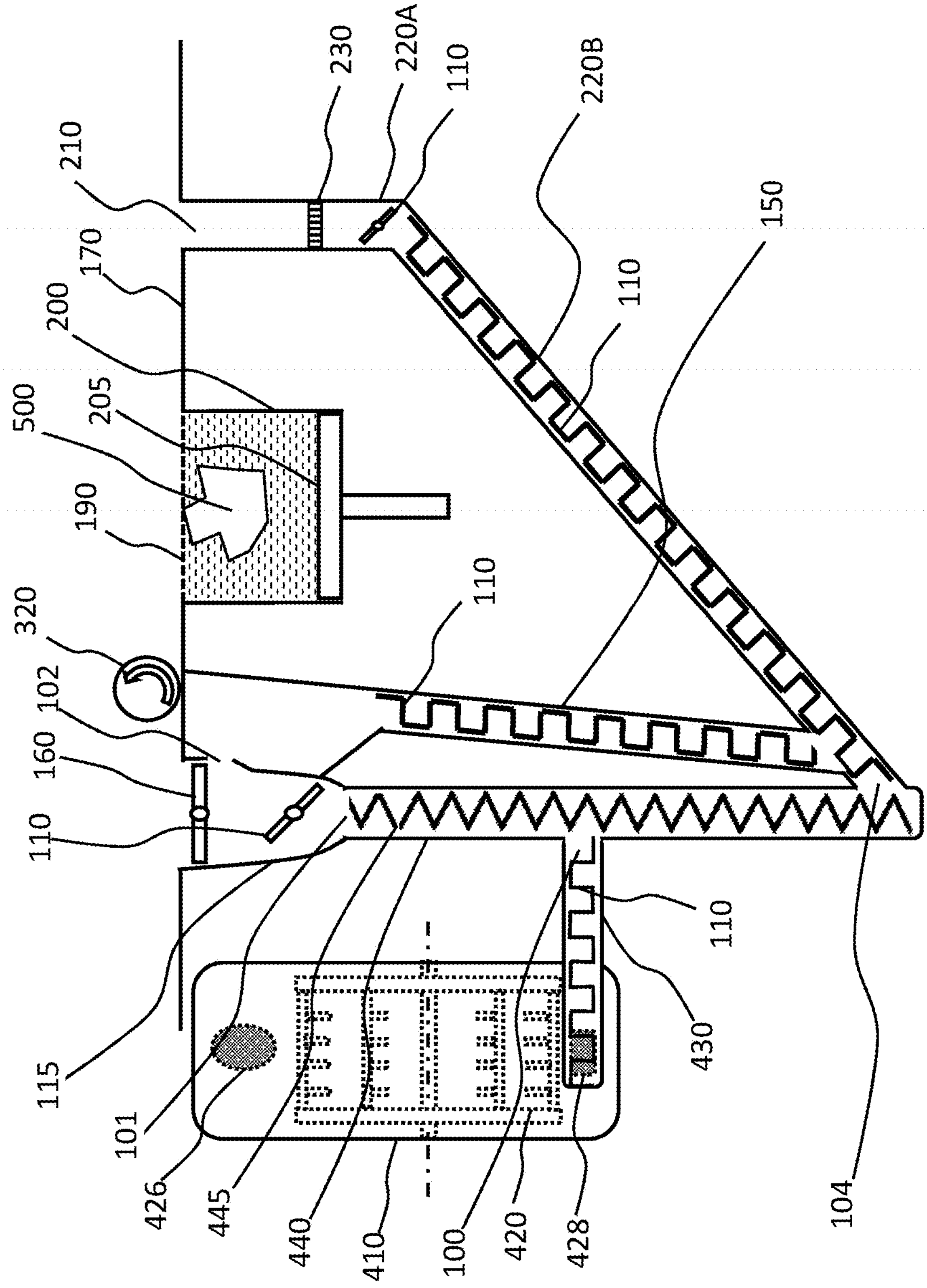
FIG. 2 schematically illustrates a cut through of components of the apparatus.

FIG. 2 schematically illustrates a cut through of the components of the apparatus 1. The powder enters the holding tank 410 through inlet 426 and exits the holding tank 410 through outlet 428. Upon exit from the holding tank 410, via the outlet 428, the powder travels into a supply tube 430. The outlet 428 may be located at the bottom of the holding tank 410, or may be located on a wall of the holding tank 410. FIG. 2 illustrates the outlet 428 being located on a wall of the holding tank 410, above the floor of the holding tank 410. For this location, it may be necessary to use a stirring device within the tank 410 to ensure that the powder below the outlet 428 is being used.

The powder flows through the outlet 428 into the supply tube 430. The supply tube 430 may comprise an agitator arranged within the supply tube 430, which aids the free flow of the powder along the supply tube 430 to a delivery tube 440. The supply tube 430 may be arranged at an angle such that the powder may flow by a gravitational force. The agitator is described in more detail below with reference to FIG. 6. The powder then enters the delivery tube 440 at inlet 100.

The delivery tube 440 comprises a delivery mechanism arranged within the delivery tube 440, which aids movement of the powder along the delivery tube 440 to an inlet 101 to a powder repository 115. According to one embodiment, the delivery mechanism comprises an auger screw 445 provided within the delivery tube 440, extending at least within the majority of the delivery tube's 440 length. The auger screw diameter is slightly smaller than the inner diameter of the delivery tube 440, such that the auger screw 445 is capable of rotation within the delivery tube 440. As known in the art, an auger screw 445 comprises a helical blade, which, when rotated within the delivery tube 440, conveys the powder along the direction of the axis of rotation. The auger screw 445 may be arranged to convey the powder from the inlet 100 along the delivery tube 440 towards the inlet 101 of the powder repository 115 by imparting a force on the powder along the axis of rotation. According to one embodiment, the delivery tube 440 may be arranged at an angle to the vertical direction, such that the delivery tube 440 is angled upwards with respect to the gravitational direction.

Figure 4:
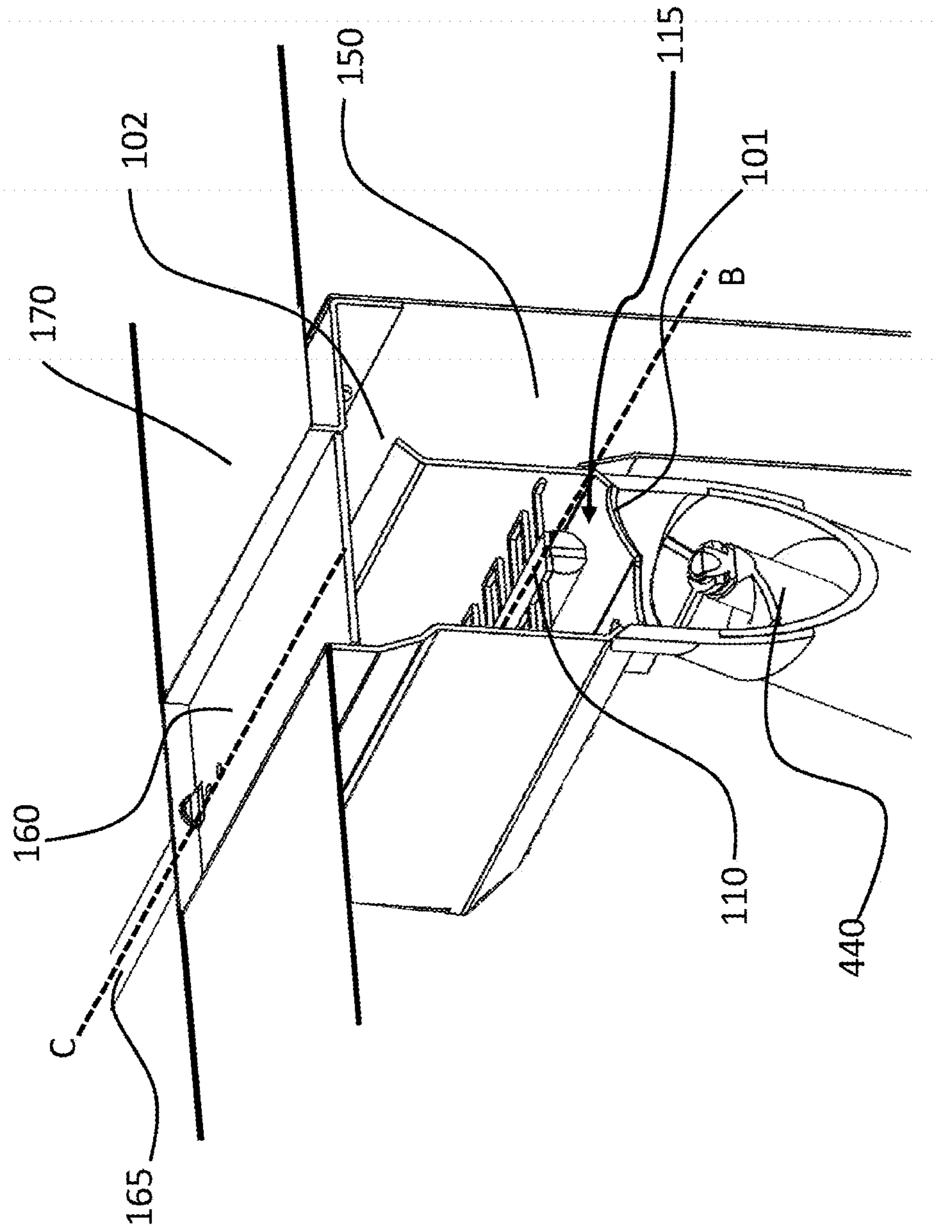
FIG. 4 schematically illustrates a cut through of components of the apparatus.

According to one embodiment, as illustrated in FIGS. 2 and 4, the supply tube 430 is connected to the delivery tube 440 at inlet 100, located part way along the length of the delivery tube 440 and the auger screw 445. For example, the supply tube 430 may be connected to the delivery tube 440 at a location closer to a downstream end, with respect to the direction of powder delivery, of the auger screw 445, than the middle of the auger screw 445. The above described arrangement of the holding tank 410, supply tube 430 and delivery tube 440 enables the holding tank 410 to be contained below a work table level 170 of the apparatus 1, minimising the vertical height that the powder needs to be conveyed to reach the work table level 170, and providing space below the connection point 100 of the supply tube 430 to the delivery tube 440 where other tubes (powder flow paths) may be connected to the delivery tube 440.

When the holding tank 410 is unheated, the supply tube 430 may be thermally decoupled from the delivery tube 440 via insulation between the supply tube 430 and the delivery tube 440.

Figure 3:
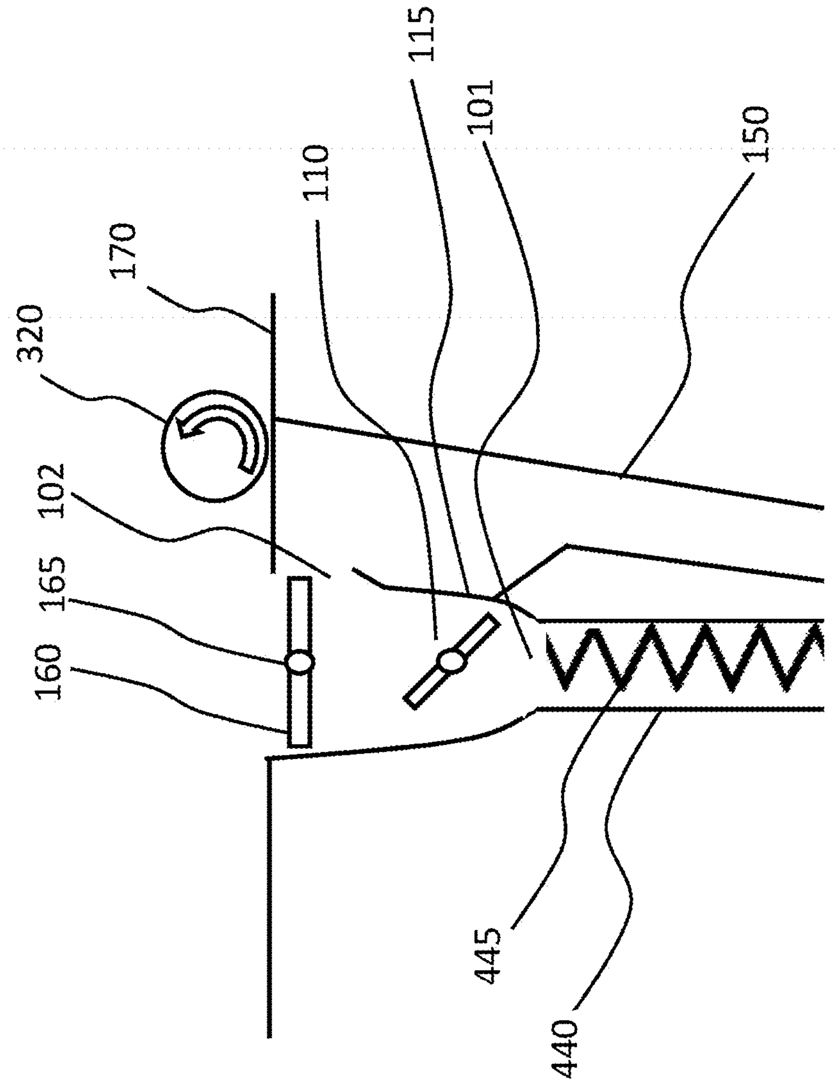
FIG. 3 schematically illustrates another cut through of components of the apparatus.

As illustrated in FIGS. 3 and 4, the delivery tube 440 is connected to a substantially horizontal powder repository 115 at inlet 101, which may for example take the overall shape of an elongate slot. The auger screw 445 conveys the powder along the delivery tube 440 into the repository 115 via inlet 101. The inlet 101 acts as a feed point, feeding the powder into the repository 115. Although FIGS. 3 and 4 illustrates the delivery tube 440 connecting to one end of the repository 115, the delivery tube 440 may be connected at any location along the repository 115, such as, at or near one end of the repository 115, or about halfway along the length of the repository 115. According to another embodiment, there may be provided more than one delivery tube 440 and inlet 101, such that the powder is conveyed into the repository 115 from multiple inlets 101.

An agitator 110 may be provided within the powder repository 115. Movement of the agitator 110 within the powder repository 115 keeps the powder in a free flowing or near free flowing state, such that it prevents the powder from agglomerating and allows it to spread along the length of the agitator by gravitational force. The agitator 110 does not push the powder along the repository 115 by imparting a significant force component on it along the length of the repository 115, and consequently the powder is not compacted. It has been found that when an auger screw is provided in the powder repository 115, the auger screw compacts the powder due to imparting a significant force component on it along the axis of rotation, which also moves the powder along the repository 115, which is connected to the delivery tube 440, to one end of the repository 115. Compaction inhibits the free flow of the powder which is undesirable. Therefore, an agitator 110 may be provided in the powder repository, which is arranged in close proximity or as a combined part with the delivery tube 440 comprising an auger screw 445. The agitator 110 agitates the powder in the repository 115 and prevents it from agglomerating before it is delivered onto the work surface 170.

Figure 7:
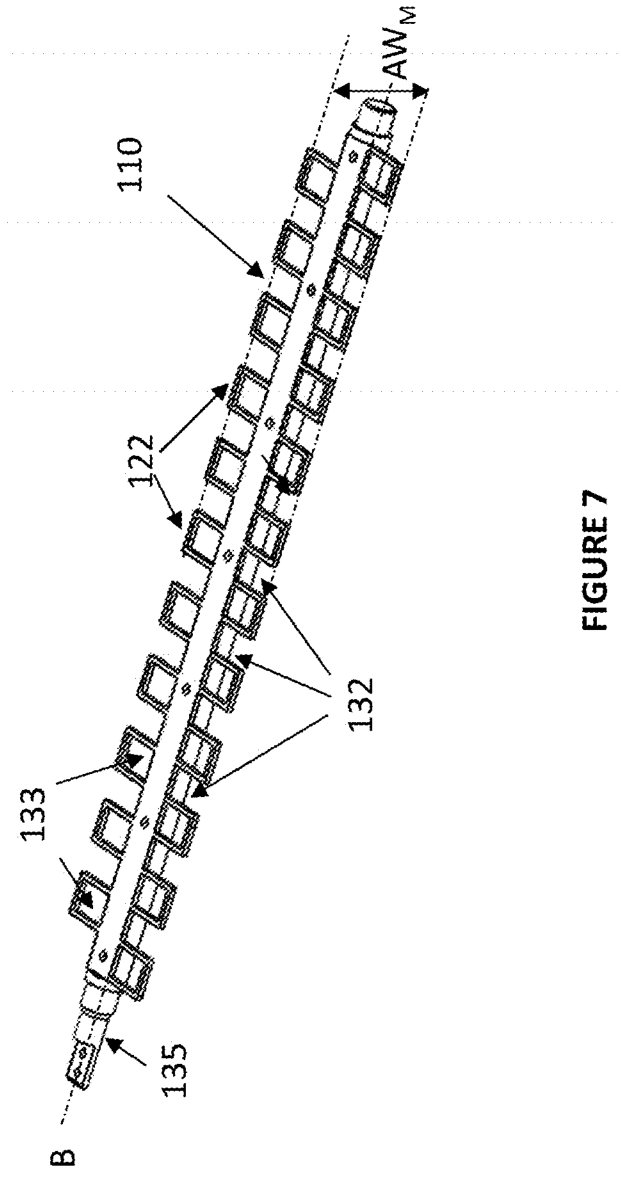
FIG. 7 schematically illustrates an embodiment of an agitator.

FIG. 7 illustrates an exemplary agitator 110. The agitator 110 may span the length of the powder repository 115 and be sized such as to be able to rotate within the repository 115 without contacting the walls of the repository 115.

The agitator 110 of FIG. 7 comprises a plurality of projections 122 mounted on a shaft 135. The projections 122 extend outwardly from the shaft 135. As illustrated in FIG. 7, each blade 122 is substantially rectangular in shape however, the projections 122 are not limited to being substantially rectangular in shape. Each projection 122 has a cavity 132 formed within the projection 122. In addition, cavities 133 are created in the gaps between the adjacent projections 122.

The plurality of projections 122 alternately project in opposite directions outwardly from the shaft 135, along the shaft. According to FIG. 7, the plurality of projections 122 are formed as a single piece, which is coupled to the shaft 135. FIG. 7 illustrates twenty-three projections 122, however, any number of projections 122 may be provided as required, depending on the length of the shaft 135.

The projections 122 illustrated in FIG. 7 do not impart a force in the axial direction (along the axis of rotation B) on the powder within the repository 115. The powder spreads along the repository as a result of rotating the agitator. In addition, the agitator 110 illustrated in FIG. 7 comprises cavities 132, 133 which enable the powder to flow around the agitator 110 when the agitator 110 is fully or partially rotating within the repository 115.

As illustrated in FIGS. 2 to 5, the repository 115 comprises an outlet 102 such that when the powder reaches a certain level within the repository 115, the powder flows through the outlet 102 and is reintroduced into the delivery tube 440. The powder from outlet 102 travels along a recirculating tube 150. The recirculating tube 150 may be arranged such that the powder enters and travels along it by gravitational force.

Figure 5:
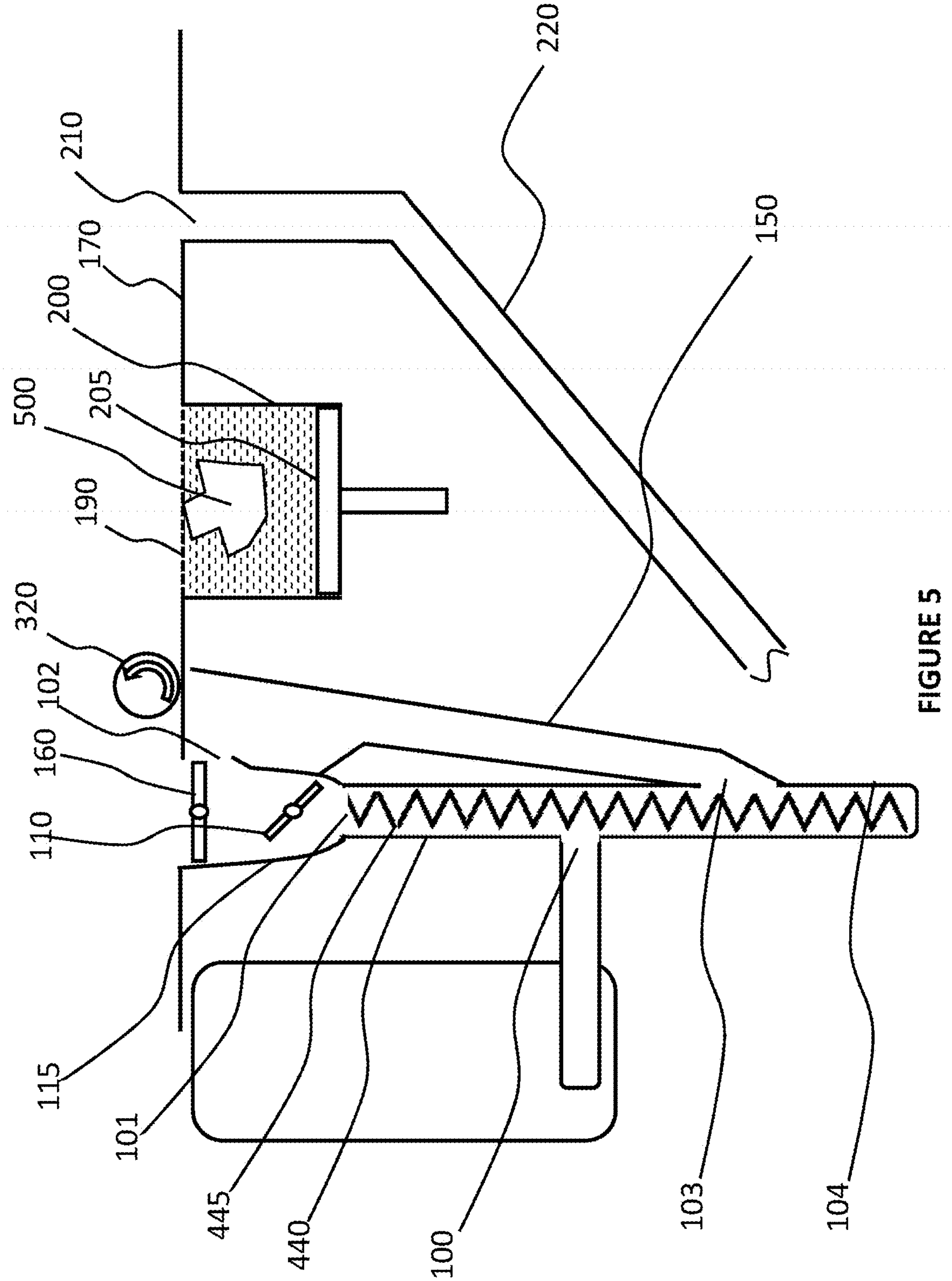
FIG. 5 schematically illustrates another cut through of components of the apparatus.

According to the embodiment illustrated in FIG. 5, the recirculating tube 150 may be connected to the delivery tube 440 at a point upstream of the supply tube 430, such that the recirculated, unused powder enters the delivery tube 440 at an inlet 103 and is conveyed along the delivery tube 440 by the auger screw 445. Powder from the supply tube 430 may be mixed with the recirculated powder in the delivery tube 440 when the auger screw 445 has a capacity to receive more powder from the supply tube 430.

According to one embodiment, as illustrated in FIG. 2, the recirculating tube 150 may comprise an agitator 110, for example as described above with reference to FIG. 7, arranged over part or all of the length of the recirculating tube 150 to ensure free flow of the powder along the recirculating tube 150 aided by gravity.

The recirculating tube 150 may be thermally insulated. Alternatively, where the delivery tube 440 is heated, the recirculating tube 150 may also be heated, preferably to the same temperature as the delivery tube 440, in cases where the powder material can tolerate elevated temperatures without degrading.

Returning now to FIGS. 2 to 4, the delivery of powder onto the work surface 170 will be described. The apparatus comprises a dosing blade 160 provided at or near the top of the repository 115. The dosing blade 160 is capable of rotation about the axis of rotation, which is the axis extending along the length direction of the repository 115 and through the centrally protruding pivot shaft 165. The dosing blade 160 is provided above the agitator 110.

When the dosing blade 160 is rotated through 180 degrees, it pushes powder which has accumulated near the top of the repository 115 onto the work surface 170 to form a pile of powder on the work surface 170, along the length of the top surface of the repository 115.

The powder is then spread across the work surface 170 by a roller 320, which is arranged on the powder distribution sled 300 discussed in further detail below. The roller 320 pushes the powder across the work surface 170, covering the build area 190 with a thin layer of powder. The thickness of the layer of powder is determined by the distance the floor 205 of the build chamber 200 has been lowered relative to the top surface of the previous layer of powder.

The three-dimensional object 500 to be manufactured is formed within the build area 190 of the build chamber 200. A thin layer of powder is spread across the work surface 170. The absorber is printed onto and sintered, as discussed in detail below, after which the floor 205 of the build chamber 200 is lowered within the build chamber 200, and the next layer of powder is spread onto the printed powder bed. The layers of powder are built up by successive spreading/printing/sintering steps as for each step the floor 205 of the build chamber 200 is lowered within the build chamber 200 by the thickness of a layer of each step.

Any excess powder at the end of travel of roller 320 which has not been used in covering the build area 190 may be recovered for further use. FIGS. 2 and 4 illustrates a return slot 210 provided to the work surface 170 at a side of the build area 190 opposite from the dosing blade 160. The return slot 210 may be arranged to receive excess powder, which is pushed into the return slot 210 by the roller 320. According to one embodiment, a filter or mesh 230, as illustrated in FIG. 2, may be provided in the return slot 210 to prevent unwanted objects from entering the apparatus 1. Examples of unwanted objects are large agglomerations, broken of parts from sintered/printed models or similar unwanted objects. If such an unwanted object enters the apparatus 1, it may result in the blockage of powder feeding tubes 440, 115, 220A or 220B, may damage the current build and potentially damage the apparatus 1.

The apparatus 1 may or may not measure the amount of powder to be deposited by the dosing blade on the work surface in order to deposit a layer of powder in the build area 190.

Instead, the dosing blade provides approximately the same amount for each layer deposition step, which is more powder than is required for a new powder layer, and the excess powder which is not required is pushed into the return slot 210. By providing excess powder at the work surface, an even distribution of the powder across the build area may be achieved.

The return slot 210 is coupled to a return tube 220. The return tube 220 may comprise two tubes, namely, an upper return tube 220A and a lower return tube 220B. The return slot 210 may contain an agitator 110 so as to maintain the powder in a free flowing state.

The excess powder travels along the return tube 220. The return tube 220 may be arranged such that the excess powder travels along it by essentially gravitational force.

The return tube 220 (the lower return tube 220B) may be connected to the delivery tube 440, as illustrated in FIG. 5, at a point upstream of the supply tube 430, such that the excess powder enters the delivery tube 440 at inlet 104 and is conveyed along the delivery tube 440 by the auger screw 445. Powder from the supply tube 430 may be mixed with the excess powder in the delivery tube 440 when the auger screw 445 has capacity to receive more powder from the supply tube 430. The excess powder travels back to the repository 115. Accordingly, unused excess powder is recirculated via the return tube 220 into the delivery tube 440. According to one embodiment, an agitator 110 may be provided in all or part of the length of the return tube 220, to ensure the free flow of powder along the tube 220.

The return tube 220 may be thermally insulated. Where the delivery tube 440 is heated, the return tube 220 may also be heated, preferably to the same temperature as the delivery tube 440, in the case where the powder material can be held at elevated temperatures without degrading significantly.

As illustrated in FIG. 2, the return tube 220 may be connected to the recirculating tube 150, such that the excess powder and recirculated powder are combined and enter the delivery tube 440 at the same inlet. It may be beneficial to connect the return tube 220 and the recirculating tube 150 so as to minimise the entry points into the delivery tube 440. Additionally, by combining the excess powder and recirculated powder prior to entry to the delivery tube 440, the excess powder and the recirculated powder are given the same priority of being reintroduced into the delivery tube 440.

Figure 6:
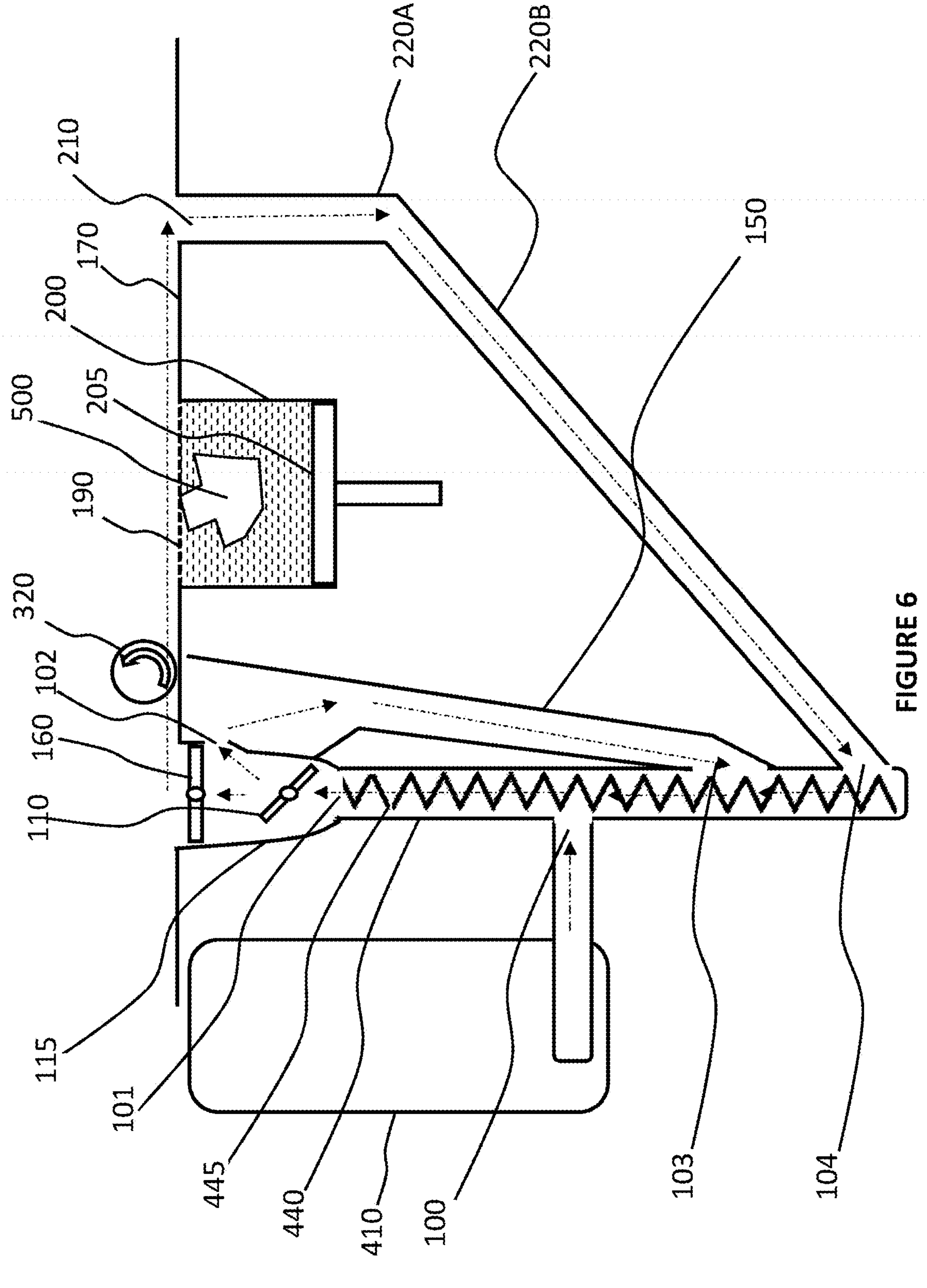
FIG. 6 schematically illustrates another embodiment of the invention.

Alternatively, the return tube 220 may be connected to the delivery tube 440 at an inlet 104 upstream of the inlet 100 from the supply tube 430, and for example also upstream of the inlet 103 of the recirculating tube 150. This prioritises the use of powder from the return tube 220 over that of the recirculating tube 150, and prioritises the use of powder from the recirculating tube 150. This arrangement is illustrated in FIG. 6. However, the prioritisation order is not limited to the arrangement illustrated in FIG. 6 and different combinations exist that alter the order of the prioritisation.

It will be appreciated that references to the supply tube 430, recirculating tube 150 and return tube 220 do not limit such tubes to having a cylindrical cross section. Instead, the tubes may have any suitable cross section, for example that of a semicircle, oblong, or rectangular cross section etc.

Furthermore, the powder repository 115, supply tube 430, recirculating tube 150 and return tube 220 may all be considered flow paths for the powder. Moreover, the powder repository 115, the supply tube 430, the recirculating tube 150 and/or the return tube 220 may comprise an agitator so as to maintain the powder in a free flowing state whilst travelling along these powder flow paths. Alternatively, the supply tube 430, recirculating tube 150 and return tube 220 may not comprise agitators.

Turning now to the operation of the powder distribution sled 300 and the printing sled 350, FIG. 1 illustrates two independently operable sleds 300, 350 provided above the work surface 170 of the apparatus 1. The powder distribution sled 300 comprises a roller 320, and the printing sled 350 comprises a sinter source 360, such as a sinter lamp, and printheads 370. The powder distribution sled 300 may also comprise a pre-heat source 310

The pre-heat source 310 and the sinter source 360 are infrared radiation sources that may comprise halogen lamps, either in the form of modular sources or a full width single bulb; arrays of infrared radiation (IR) light-emitting diodes (LEDs); ceramic lamps; argon lamps; or any other suitable infrared radiation emitter.

The one or more printheads 370, used for depositing the RAM, may be a standard drop on demand printhead suitable for use in an HSS apparatus, such as a Xaar 1003 printhead. The Xaar 1003 printhead for example is able to deposit RAM suspended or soluble in a variety of liquids, and tolerates well the challenging hot and particulate environment of an HSS printer due to its highly effective ink recirculation technology.

Returning to FIG. 1, the sleds 300, 350 may be moved across the work surface 170 of the apparatus 1 via motors provided on each sled 300, 350 which may utilise the same drive belt or different drive belts, although other methods of moving the sleds may be utilised, as known in the art. According to one embodiment, the two sleds 300, 350 are moveable on the same set of rails. According to another embodiment, the two sleds 300, 350 are moveable on separate rails.

Following rotation of the dosing blade 160 to deposit a pile of powder on the work surface 170, the powder distribution sled 300 travels across the dosing blade 160, and the roller 320 pushes the powder across the work surface 170 of the apparatus. The pile of powder is spread across the work surface 170 by the roller 320, such that a layer of powder covers the build area 190 and any excess powder is pushed down the return slot 210. When the powder distribution sled 300 also comprises a pre-heat source 310, the layer of powder is heated by the preheat lamp 310 as it is spread across the build area 190 by the roller 320. However, when the powder distribution sled 300 does not comprises a pre-heat source 310, an overhead heat source may be provided above the build area 190. Alternatively, the sinter source provided at the printing sled 350 may function as a pre-heat source if required.

The printing sled 350 is then moved across the work surface 170 of the apparatus, and an absorber, such as a radiation absorbent material (RAM), is printed onto the layer of powder within the build area 190 in accordance with image data defining the pattern of each layer of the final object being built by the printheads 370. The printed portion of the layer of powder in the build area 190 is then sintered as the sinter lamp 360 is moved across the entire build area 190, with the effect that only the powder that received the absorber heats up sufficiently to fuse.

The floor 205 of the build chamber 200 is lowered within the build chamber 200, and the next layer of powder is spread across the work surface 170 by the roller 320, and the process begins again. The build chamber floor 205 is lowered by the thickness of a layer of the build, this might be in the region of 0.1 mm.

In order to provide case of access to the build area 190, the rails 450 may be offset from one another vertically. For example, the rail at the front of the machine may be below the level of the work table 170 to allow easy access to the build chamber 200 whilst the back rail may be above the height of the work table to allow access for maintaining or cleaning the rail.

The position of the sleds 300, 350 relative to the build area 190 may be monitored by a position sensor provided on each sled 300, 350. The position sensors may be magnetic sensors with scale mounted on a static part of the machine, a rotary encoder, an optical sensor with scale mounted on a static part of the machine, laser positioning, etc.

As is known in the art, high speed sintering machines operate at high temperatures, in particular in the proximity of the build area 190. For example, the temperature near the build area may be around 185° C. Consequently, temperature sensitive elements of the machine, such as printheads 370, may require to be shielded from the heat. An insulated housing may be provided around the printheads to provide such shielding.

An overhead heater 460 may be provided above the build area to provide a uniform temperature on the surface of the build area 190. The overhead heater 460 may be any fixed infrared radiation source, such as ceramic IR lamps or any other suitable radiation source.

According to one embodiment, bearings may be provided on one side of each sled 300, 350, the bearings being moveable orthogonal to the direction of movement of the sleds 300, 350 to allow the sleds 300, 350 to expand or contract with changes in temperature.

It is known that to achieve an even build area temperature it is beneficial to deposit several buffer layers of powder on the build chamber floor 205, prior to commencing the build, to help mitigate the effects of unevenness in temperature distribution across the surface of the build area 190. This may be done in addition to the base of the build chamber floor 205 being heated.

The buffer layers, may or may not have the same thickness as the layers of a build. When the buffer layers are not the same thickness as the layers of a build, then one or more of the final buffer layers may be laid down at a thickness of the layers of a build. For example, a thickness of the layers of a build may be 0.1 mm. This thickness may be achieved by lowering the floor 205 of the build chamber by 0.1 mm.

A printhead cleaning station may be provided. The printhead cleaning station may be located at the opposite end of the work table to the dosing blade 160. Once the printing sled 350 has reached the end of the stroke, the printheads 370 may be cleaned before the next stroke. The printheads 370 may be cleaned after every stroke, every set number of strokes or in response to a printhead nozzle monitoring system.

It will be appreciated that although a high speed sintering printer apparatus and process have been described in order to illustrate how the described invention may be put in use in apparatus for the formation of three dimensional objects, the present invention may equally be used in conjunction with a different apparatus and process of manufacturing three dimensional objects that requires the delivery of powder to a work surface. This may for example include laser sintering, print and binder or electron beam apparatus and processes using a variety of powder materials.

Possible Modifications and Alternative Embodiments

Detailed embodiments have been described above, together with some possible modifications and alternatives. It will be clear to one skilled in the art that many improvements and additional modifications and alternatives can be made to the foregoing exemplary embodiments without departing from the scope of the present techniques. Some particular modifications will now be described, as follows.

Figure 8:
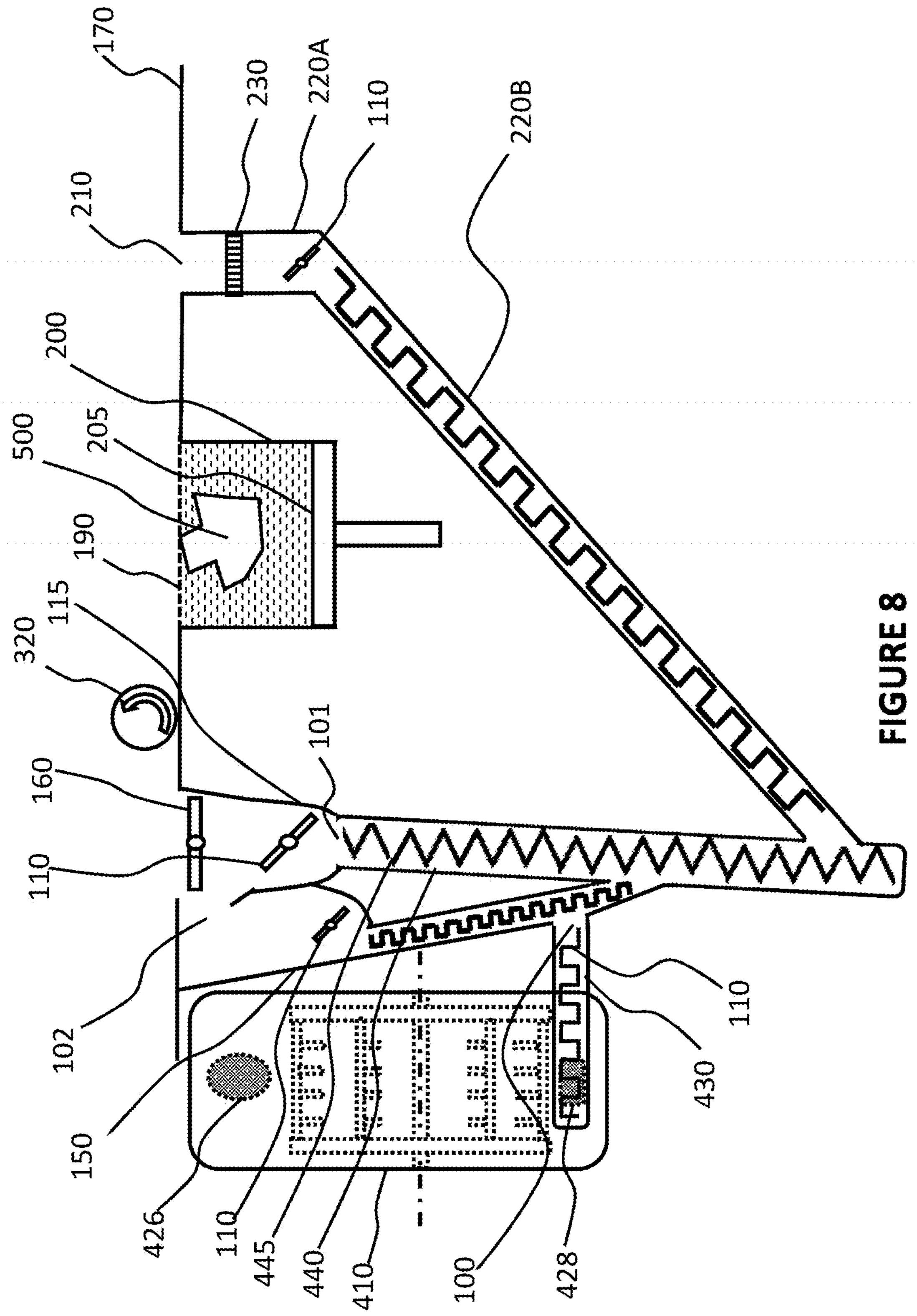
FIGS. 8 and 9 schematically illustrate modified arrangements of the apparatus, to enable virgin powder and recirculated powder to be combined.
Figure 9:
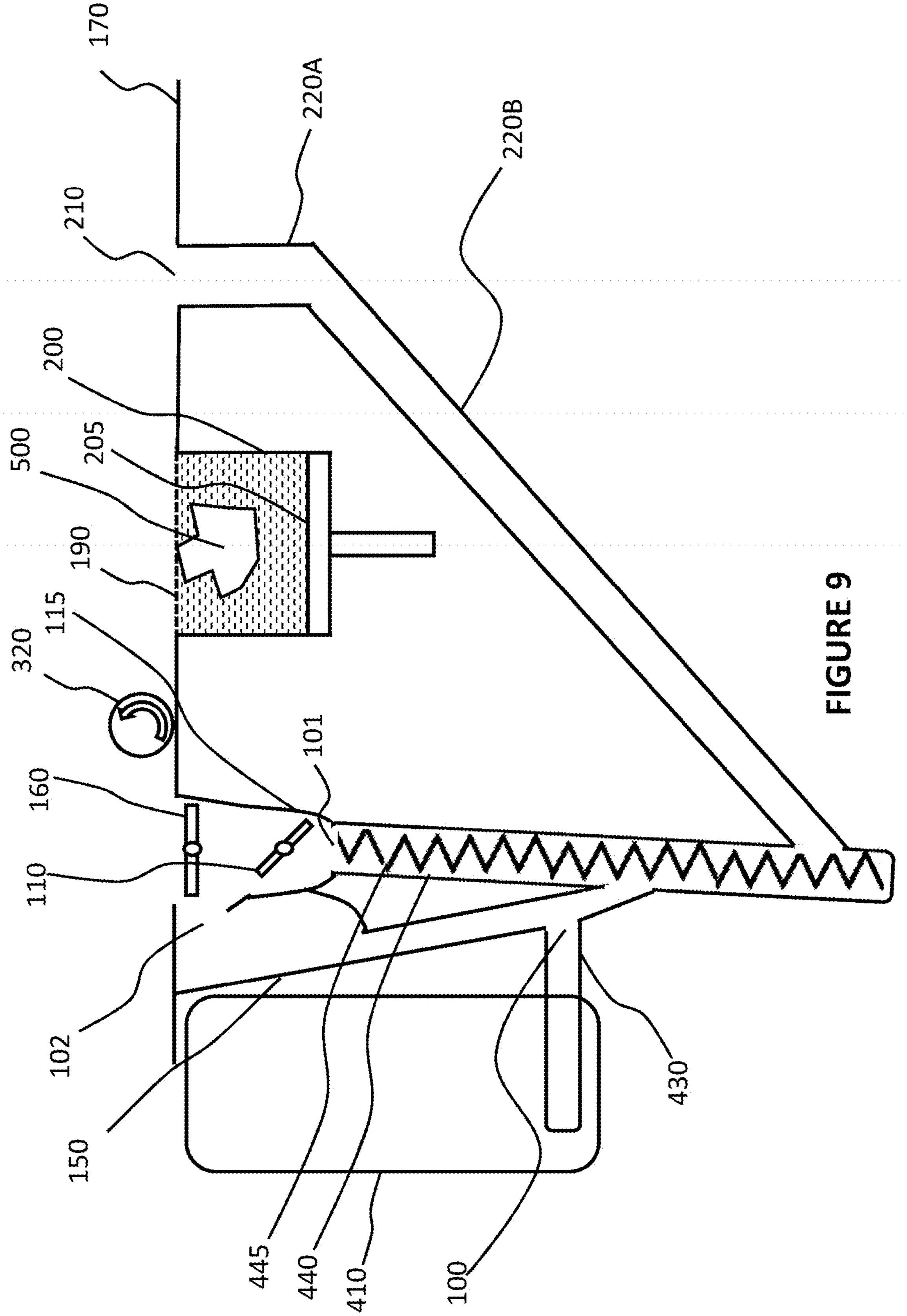

Virgin Feed Modification (FIGS. 8 and 9)

As illustrated in FIGS. 8 and 9, the supply tube 430 may be connected to the recirculating tube 150, such that the virgin powder and the recirculated powder are combined and enter the delivery tube 440 at the same inlet. This may be beneficial so as to minimise the entry points into the delivery tube 440.

Moreover, this configuration minimises feeding of powder into the system if the system is not empty and does not need powder to be added. In previous configurations in which the supply tube 430 feeds directly into the delivery tube 440, it was found that the supply tube 430 could continue to add powder to the system, even though the system was as full as it could be, resulting in an overaccumulation of powder and an operational fault occurring. It is believed that this was due to the powder being feed into small voids (cavities of air) on the backside of the blades of the auger screw 445 when this was rotating, thereby overloading an already filled system. However, by feeding the supply tube 430 into the recirculating tube 150 the supply tube agitator can be run at different times from the recirculating agitator, or the recirculating agitator can be run very slowly, thereby making sure there are no cavities. It is possible to run the recirculating agitator slowly by orienting the recirculating tube 150 close to vertical, so that it needs very little agitation to push powder. Consequently, this configuration may only take virgin powder from the supply tube 430 when the system needs it, thereby making the system self-regulating.

The supply tube 430 may have a fall of 15°. This allows the powder to be fed better from the supply tube 430 into the recirculating tube 150.

The return tube 220 (the lower return tube 220B) may be connected to the delivery tube 440 at a point upstream of the recirculating tube 150. This prioritises the use of powder from the return tube 220 over that of the recirculating tube 150 and over that of the supply tube 430. This arrangement is advantageous as the recycled powder in the return tube 220 has been exposed to higher temperatures than the virgin or recirculated powder (the recirculated powder having been exposed to higher temperatures more than the virgin powder) and thus the recycled powder in the return tube 220 may be used first, instead of the virgin powder or the recirculated powder. In such a manner, the recyclability of the powder may be improved.

Figure 10:
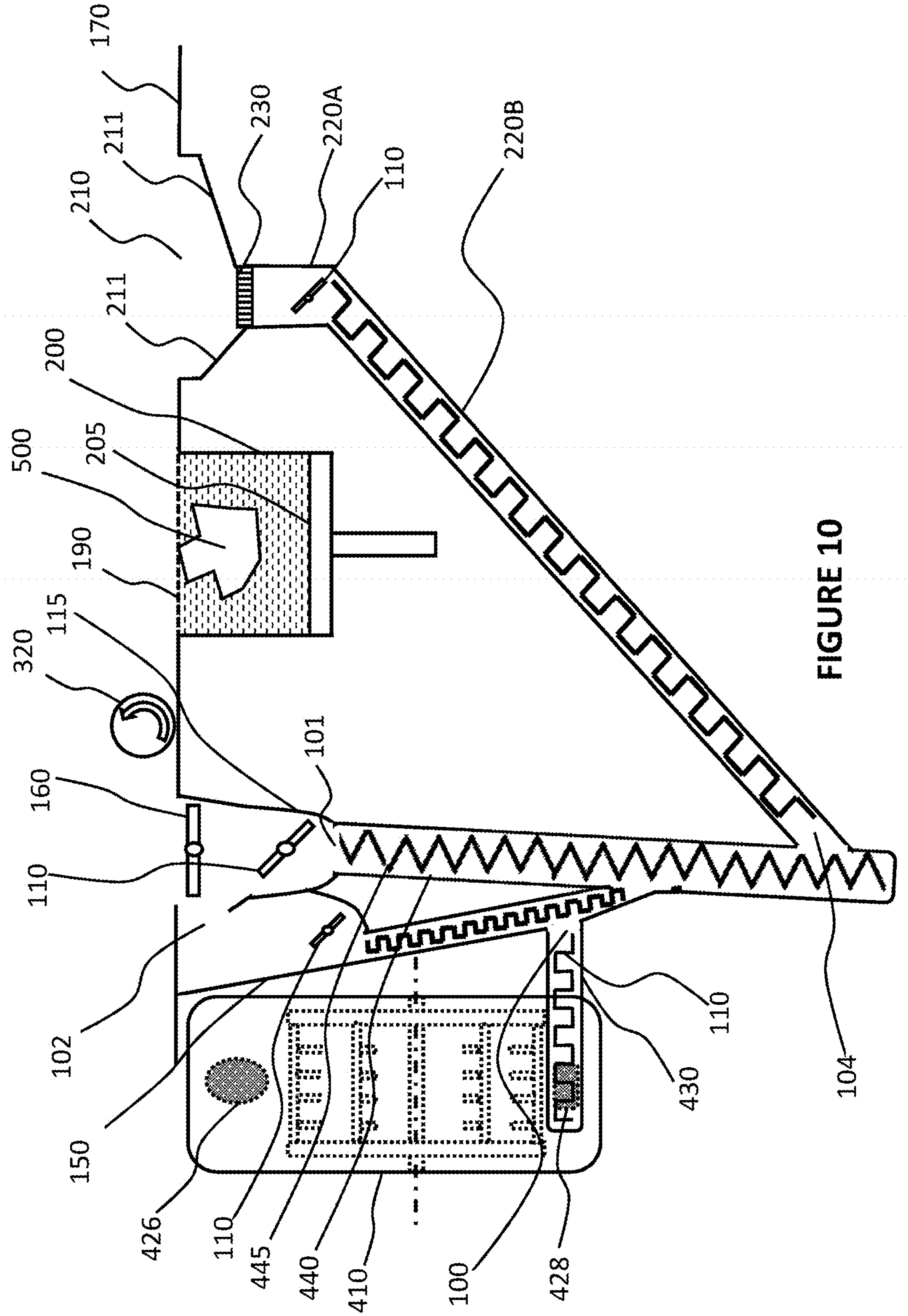
FIGS. 10 and 11 schematically illustrate a modified configuration of a return slot/hopper (as applied, by way of example, to the apparatus of FIGS. 8 and 9)
Figure 11:
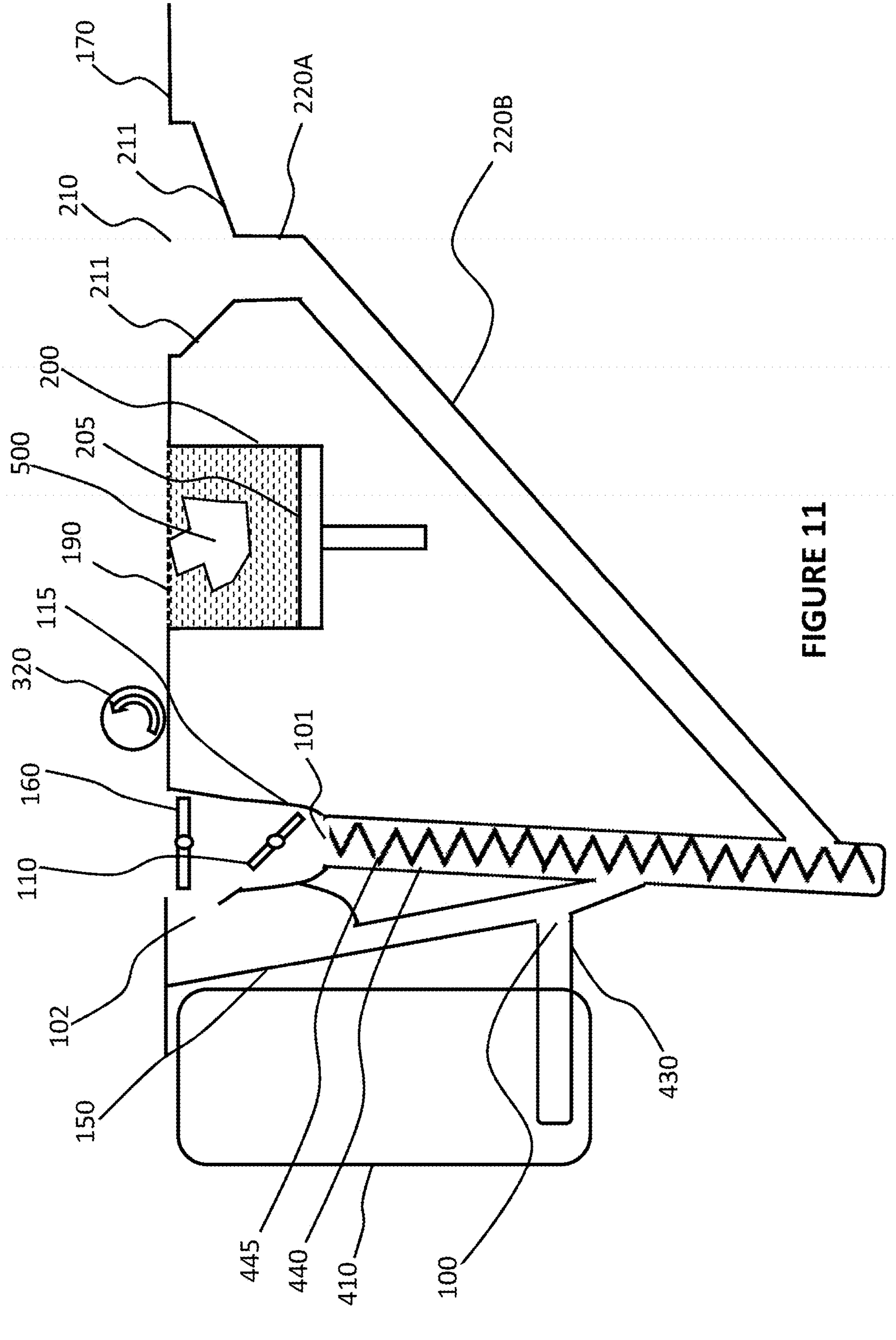

Return Slot Shaped as a Hopper (FIGS. 10 and 11)

As illustrated in FIGS. 10 and 11, the return slot 210 may have a widened opening such that the excess powder will not deposit into the far side of the work surface 170. Additionally, the return slot 210 may have one or more slanted sides 211 (i.e. shaped as a hopper) such that the excess powder can be easily collected into the return slot 210 at a controlled rate that reduces or prevents the creation of airborne particles. The powder may be fed to the return tube 220 simply by gravitational force. Moreover, powder compaction or clogging may advantageously be avoided at the entrance of the return tube 220A.

Furthermore, there could be a possibility that powder particles adhere to the surface of the return slot 210. Therefore, the return slot 210 may be arranged to have a vibrating surface or a vibrating mesh, or an alternative means for providing vibrations to the return slot 210. Such a vibrating surface may for example take the place of one of the slanted sides 211 of the hopper shape. The means for providing vibrations may include an ultrasonic transducer or piezoelectric transducer, or a rotating motor, but is not limited to these.

Figure 12:
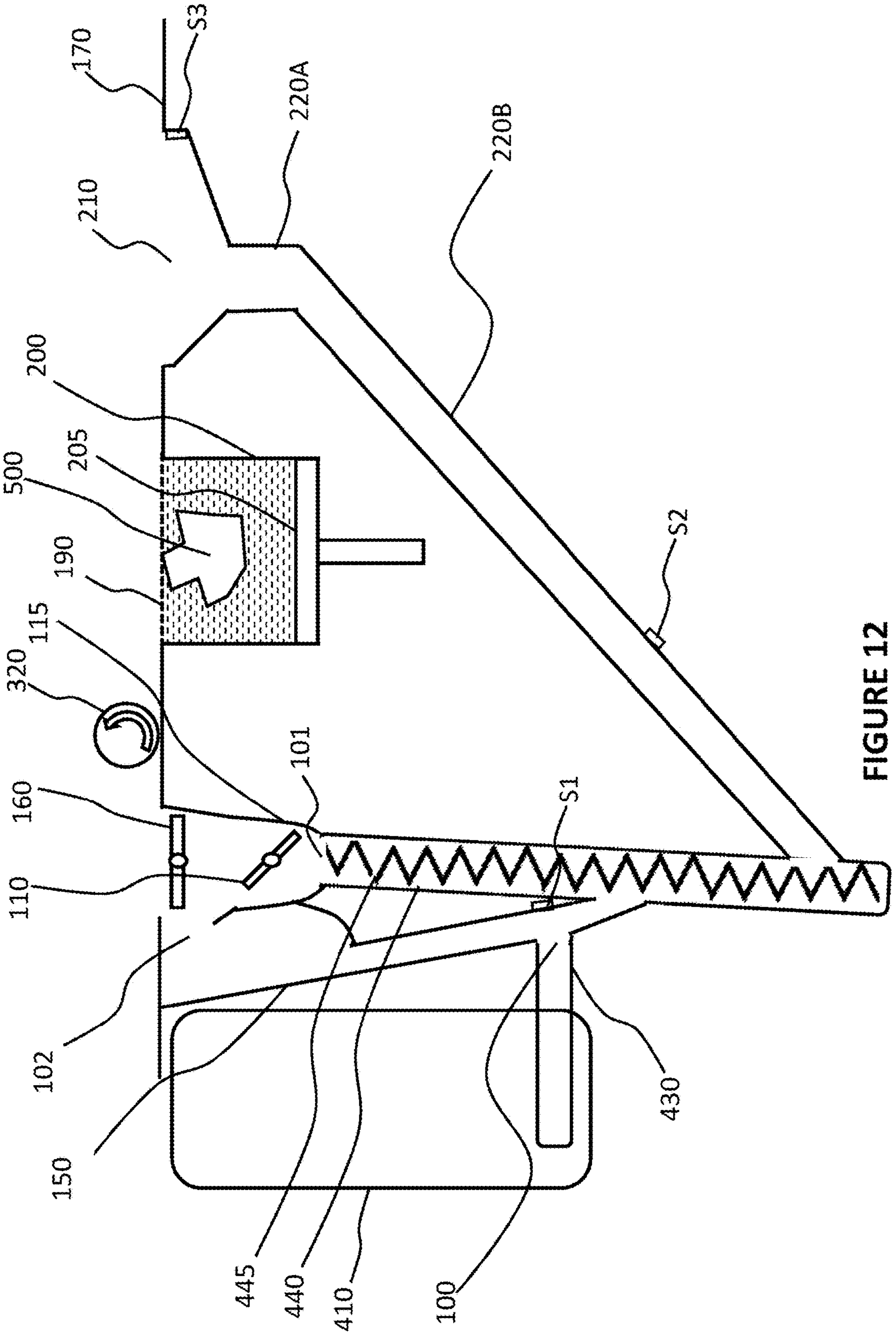
FIGS. 12 and 13 schematically illustrate possible locations of sensors (as applied, by way of example, to the apparatus of FIGS. 8 and 9)
Figure 13:
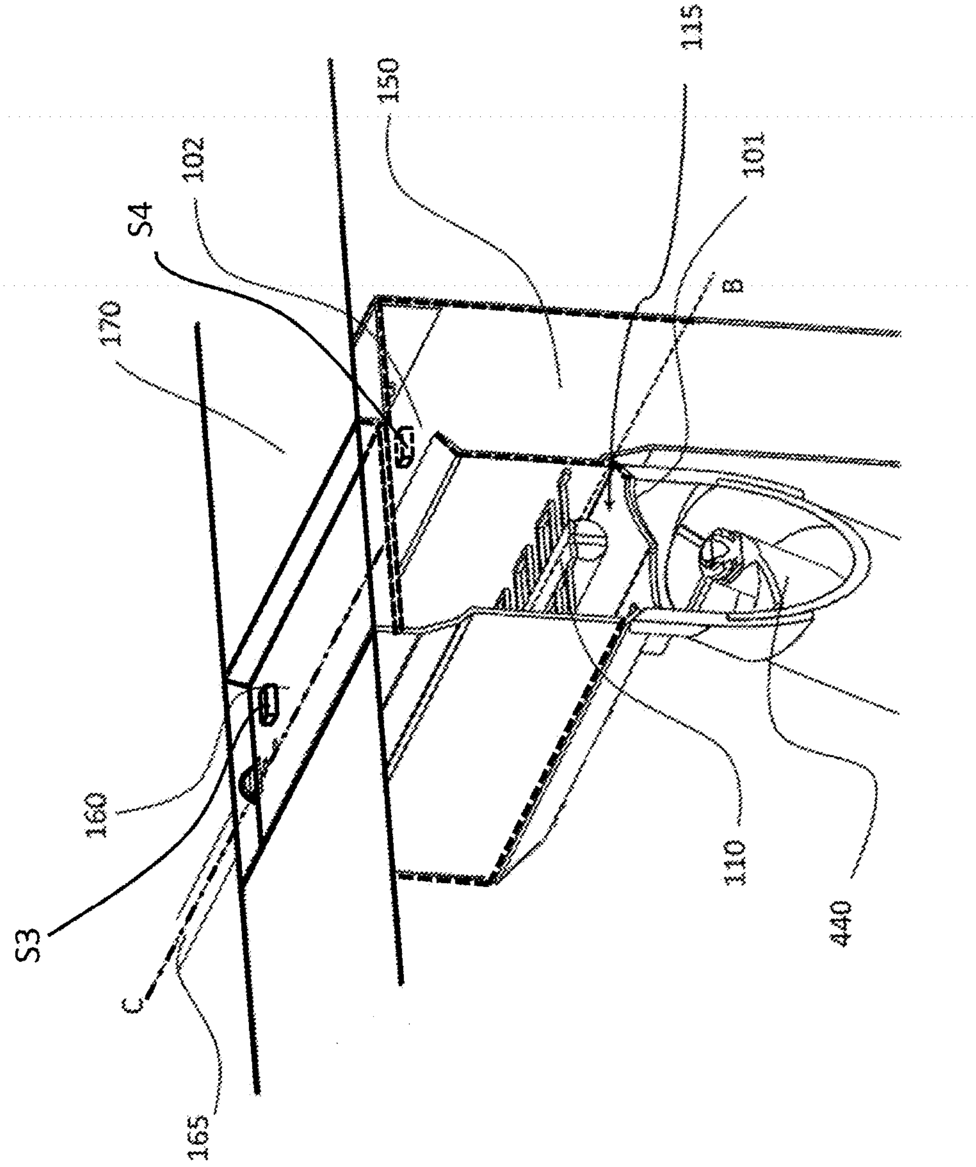

Sensors (FIGS. 12 and 13)

Different parameters of the powder can be measured or detected using one or more sensors. For example, the parameters may include the level of the powder, the temperature of the powder etc. It is important to control the parameters in the apparatus for manufacturing three-dimensional objects as the parameters may vary at different locations or points. Therefore, the parameter measurement at different points in the powder recirculation system may be beneficial to detect faults and also to control the system efficiently.

As the recirculating tube 150 comprises the powder from different sources, it may be advantageous to provide one or more sensors at different points on the recirculating tube 150. At least one sensor (not shown) may be arranged downstream or near the outlet of the recirculating tube 150 and the powder parameter may be measured at that point. Alternatively or in addition, as shown in FIG. 12 at least one sensor S1 may be disposed on the recirculating tube 150 near to the point where the supply tube 430 is connected. With this sensor the powder parameter for example, temperature may be detected at the connection point. Furthermore, at least one sensor (not shown) may be provided near the inlet of the recirculating tube 150 so as to measure the parameters of the powder entering the recirculating tube 150 from the powder repository 115.

One or more sensors S2 may also be provided on the return tube 220. Furthermore, the return slot/hopper 210 may have one or more sensors S3 so as to measure the parameters there—for example, powder level and/or temperature of the received excess powder.

Similarly, as shown in FIG. 13, the powder repository 115 may have one or more sensors S3, S4 to detect powder level and/or temperature of the powder in the repository 115.

The type of sensor(s) used at the above locations need not all be the same, and different types of sensors may be used at different locations. FIG. 12 illustrates various locations of the sensors in the powder recirculation system. However, the invention is not limited to these locations and the different types of one or more sensors may be disposed at the required locations such that they reliably detect the required parameters.

Each sensor may be a binary, digital or analog sensor. The type of sensor is not limited. Any kind of sensor generally known in the art to detect parameters of powder may be used, such as an optical sensor, capacitive sensor, thermal response sensor, rotary sensor, conductive/inductive sensor, etc.

The powder recirculation system may further comprise a controller. The output of the various sensors may be fed to the controller and the controller may control the operation of the system based on the feedback received from the various sensors. For example, if the measured powder level in the powder repository 115 is above the predetermined threshold level, the controller may stop the operation of the auger screw 445 or depending on the powder level may reduce the speed of the auger screw 445. Alternatively, the controller may alert the user by sending the signals or displaying the warning on the display panel and accordingly the user may take the appropriate action.

Similarly, if the measured powder level in the return slot/hopper 210 is above the predetermined threshold, the controller may stop the system fully or may control the dosing blade 160 to deliver less powder. Alternatively, the controller may alert the user so that the user may take out the excess powder.

Based on feedback on temperature, and after comparing it with predetermined threshold levels, the controller may shut off the system fully or partly or may control the operation of the system by slowing it down. The controller may also activate cooling systems (e.g. as discussed below in relation to FIGS. 14 and 15).

The values of the threshold levels may be pre-stored in the memory of the controller, or may be input by the user and then stored in the memory of the controller.

Figure 14:
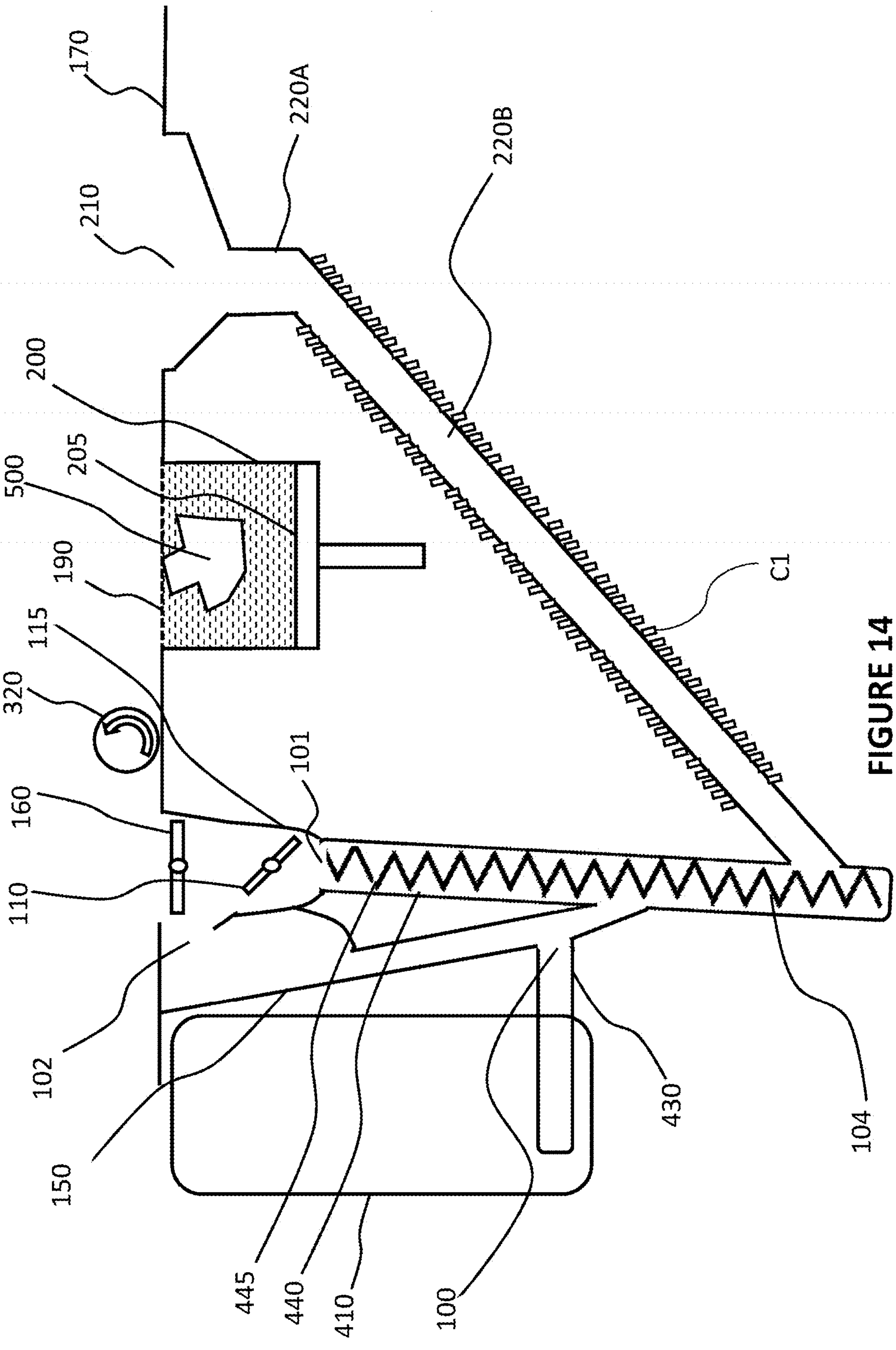
FIGS. 14 and 15 schematically illustrate possible cooling means within the apparatus (as applied, by way of example, to the apparatus of FIGS. 8 and 9)
Figure 15:
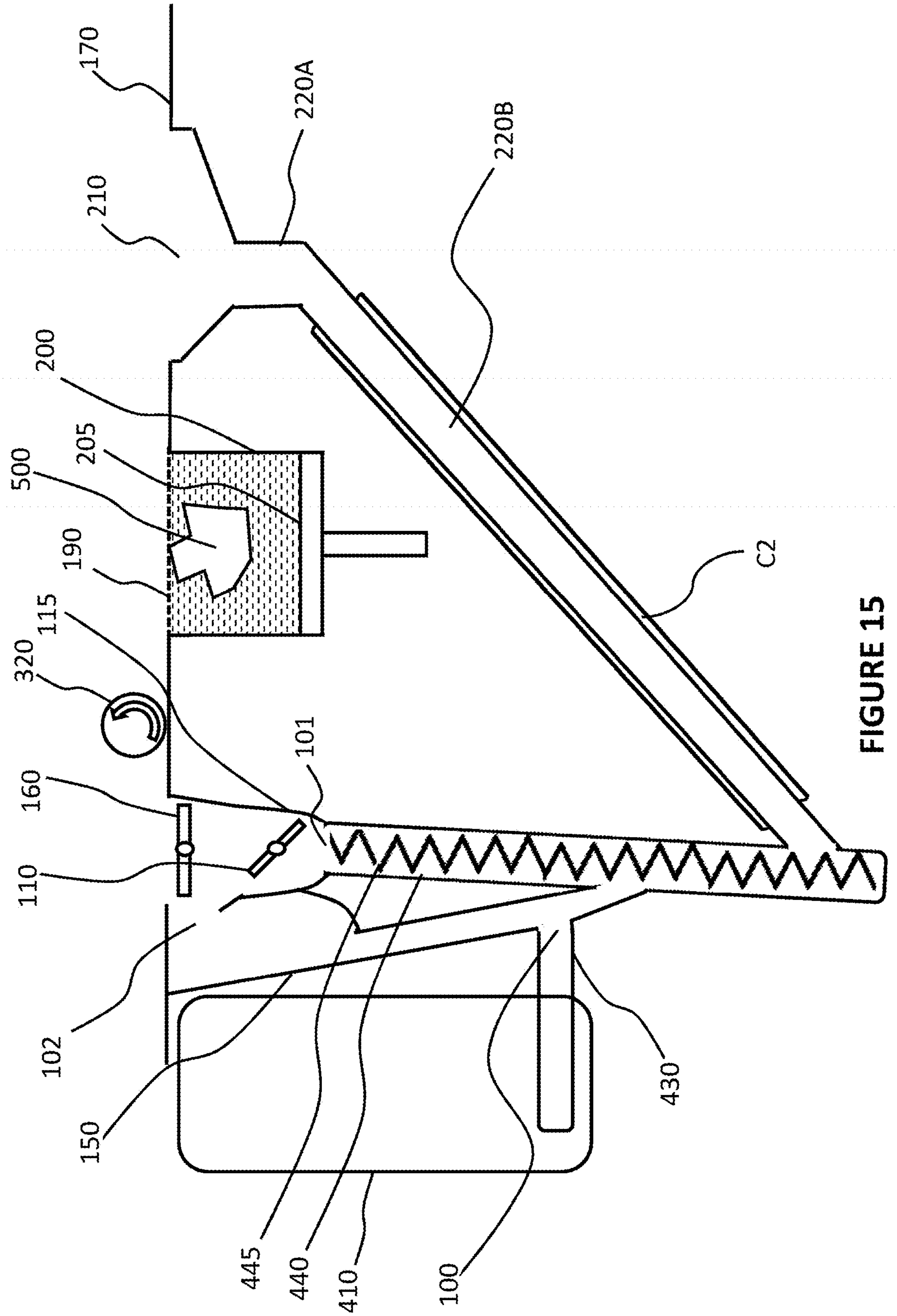

Cooling Loop (FIGS. 14 and 15)

As shown in FIGS. 14 and 15, the return tube 220 (the lower return tube 220B) may be provided with cooling means C1, C2 so as to maintain the temperature of the powder in the return tube 220 to within a predetermined threshold level. The cooling may be active or passive cooling. Any type of cooling means may be used. For example, cooling fins C1 may be provided on the periphery of the return tube 220 as shown in FIG. 14, or a cooling jacket C2 may be wrapped around the return tube 220 as shown in FIG. 15. However, the type of cooling means is not limited to these. The cooling means may be controlled by a controller which receives input(s) from one or more temperature sensors. The controller may be configured to activate the cooling means only when the sensed temperature exceeds a predetermined temperature level.

Figure 16:
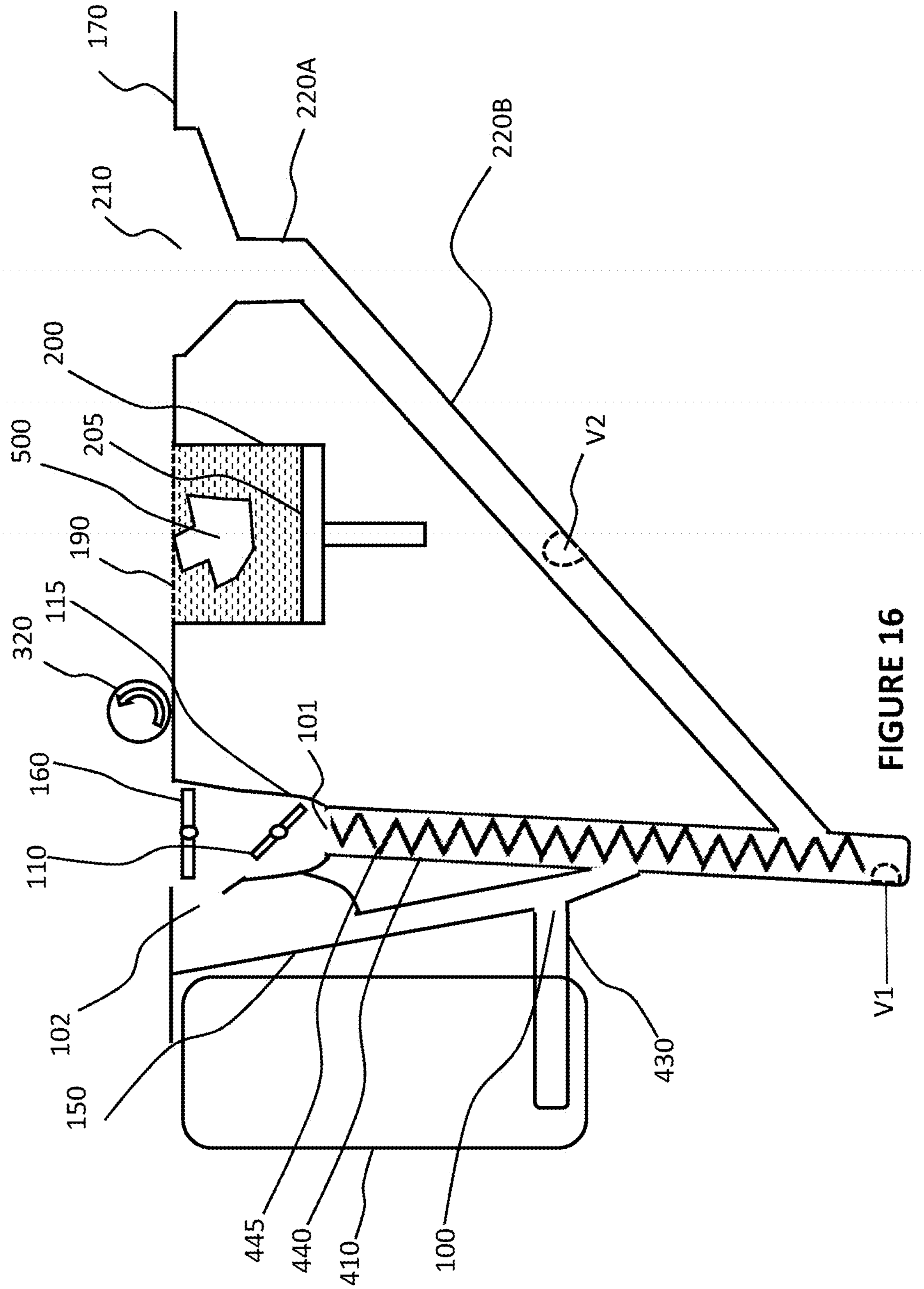
FIG. 16 schematically illustrates possible locations of powder outlet apertures and associated bypass valves (as applied, by way of example, to the apparatus of FIGS. 8 and 9)

Outlets for Powder Removal (FIG. 16)

Once a three-dimensional object (or a part thereof) has been formed, the user may want to use a different type of the powder for the next object; or may want to use different types of powders to form different parts of the three-dimensional object. In such scenarios, it may be necessary to remove the existing powder from the system. Hence, as shown in FIG. 16, it is advantageous to provide an outlet aperture (e.g. a slot or other opening) for removing the powder, and a means V1, V2 to uncover the aperture (such as a valve or an actuator-operated switch, or a sliding mechanism) at the lowest point in the powder recirculation system, or at the upstream of the auger screw 445. The powder may flow due to gravitational force, or suction may be used to remove the powder. In this way, most of the powder can be removed from the system and may be collected in a container outside the system.

Furthermore, the quality of the powder in the return tube may have degraded over time, due to multiple uses, and may no longer be suitable for further use. Therefore, to remove the degraded powder from the system, it is beneficial to have an outlet aperture (e.g. a slot or other opening) on the return tube 220, through which the degraded powder can be removed from the system, and a means to expose the aperture. The means may be a bypass valve B2, or an actuator-operated switch or a sliding mechanism.

Dust Reduction in Recirculating Tube (FIGS. 17-21)

Figure 17:
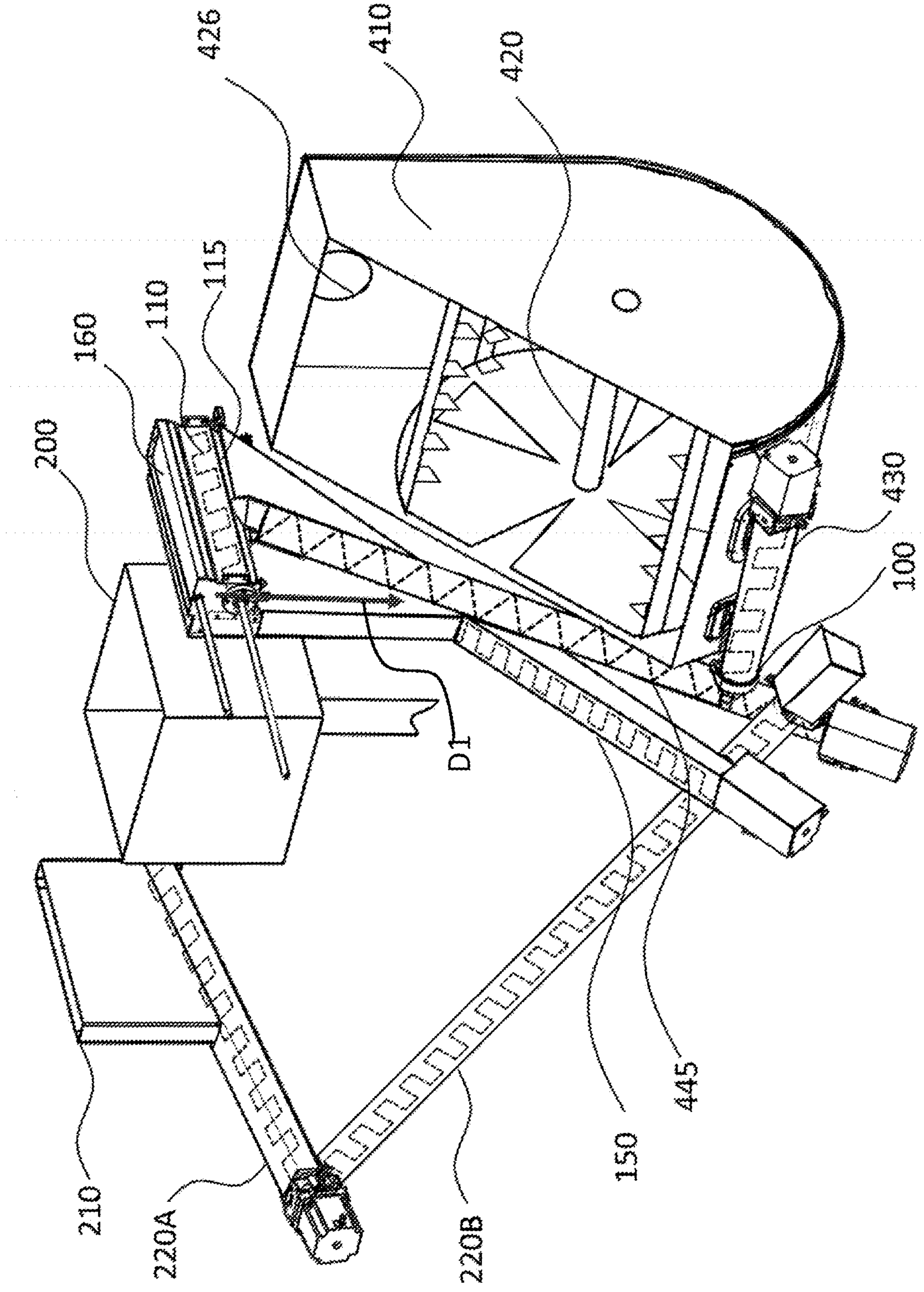
FIG. 17 schematically illustrates an example of the present apparatus in which excess powder falls down a deep steep drop during recirculation.

With reference initially to FIG. 17, during development of the present apparatus it was found that, as excess powder drops into recirculating tube 150, powdery dust may be created. This is due to the steep angle of the tube 150 causing some of the recirculated powder to drop a significant distance on entering the tube 150. This significant drop is illustrated by the downward arrow D1 in FIG. 17. The powdery dust thus produced may be released into the space/environment above the work surface 170 of the machine when the dosing blade 160 is rotated. Dust in the work surface 170 is liable to settle on moving parts and sensors, hampering accurate control of operations. Moreover, airborne dust can represent a health and safety risk to machine operators.

Figure 18:
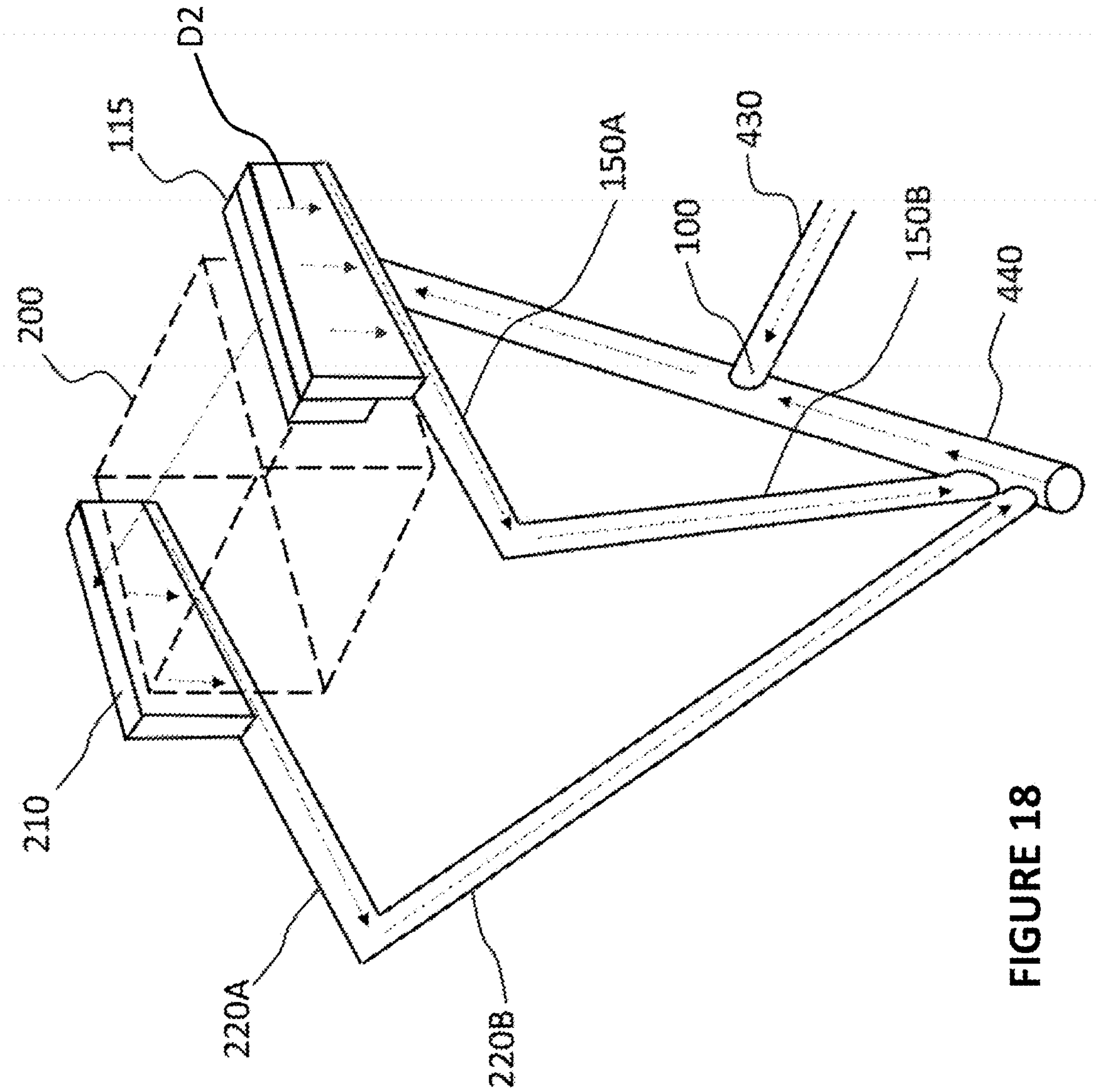
FIG. 18 schematically illustrates a modified version of the apparatus of FIG. 17, to reduce the depth of the drop through which excess powder falls during recirculation.
Figure 19:
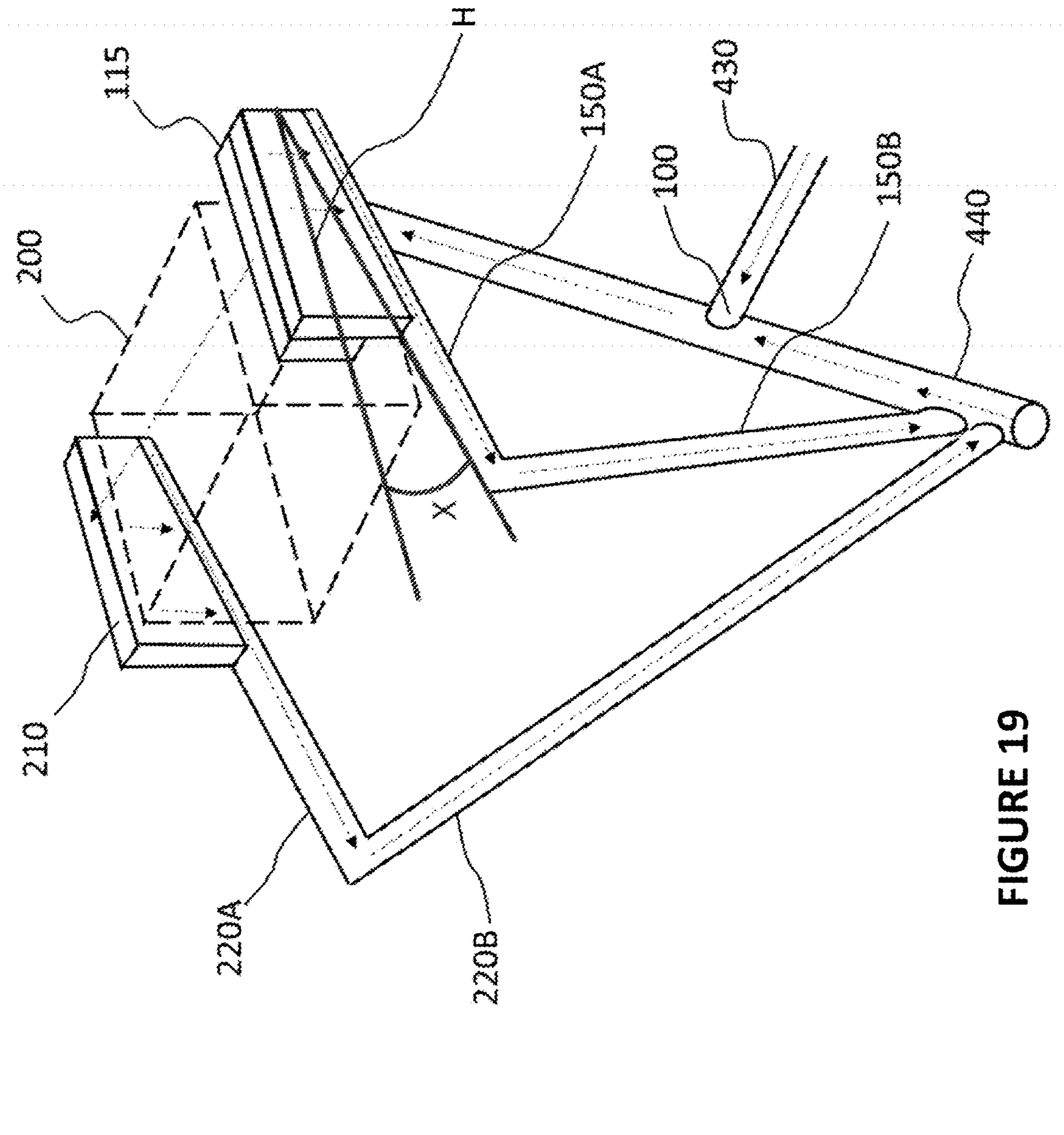
FIG. 19 indicates (in relation to FIG. 18) a shallow angle of inclination of an upper part of a recirculating tube relative to the horizontal.

To address the above problem, FIG. 18 illustrates a modified design of the powder recirculation system, in which recirculating tube 150 has been split into two sections, namely a shallow section 150A and a steep section 150B. This gives a shallower initial powder drop, as illustrated by the downward arrows D2, resulting in the generation of significantly less powdery dust. This geometry of the tubes also enables the dosing blade 160 to be rotated in the other direction, with the overflow located on the other side of the powder repository 115, compared to that shown in FIG. 3.

It should be noted that the powder repository 115 and the recirculating tube 150 have had their positions switched between FIGS. 17 and 18. With such a configuration, when the dosing blade 160 rotates, any dust produced in the recirculating tube 150 does not go onto the work surface 170.

In more detail, the shallow angle section 150A is arranged to receive overflow powder from the vicinity of the dosing blade 160 (e.g. via outlet 102 discussed above). The shallow angle of inclination of section 150A is denoted by X in FIG. 19, relative to the horizontal H. The shallowness of this angle X means that there is not a long drop at any point for powder entering the recirculating tube. The steep angle section 150B then returns the powder to the delivery tube 440. The steep angle section 150B is remote enough from the region of the dosing blade 160 that any dust produced does not enter the work surface 170 when the dosing blade 160 is rotated.

Recirculating tube sections 150A and 150B may both contain agitators to ensure the free flow of powder along them.

Figure 20:
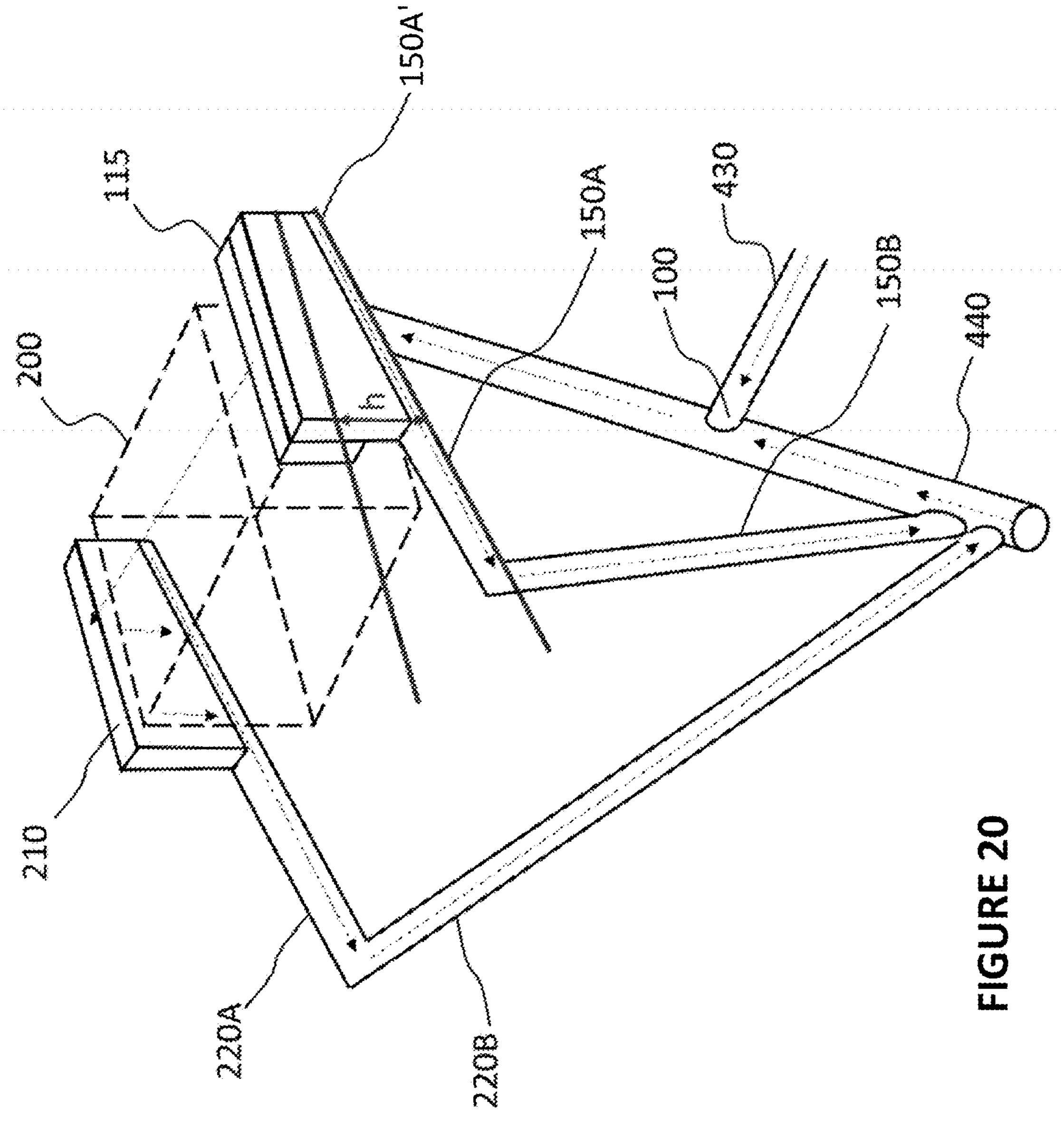
FIGS. 20 and 21 indicate (in relation to FIG. 18) the greatest distance through which excess powder drops into the upper part of the recirculating tube.
Figure 21:
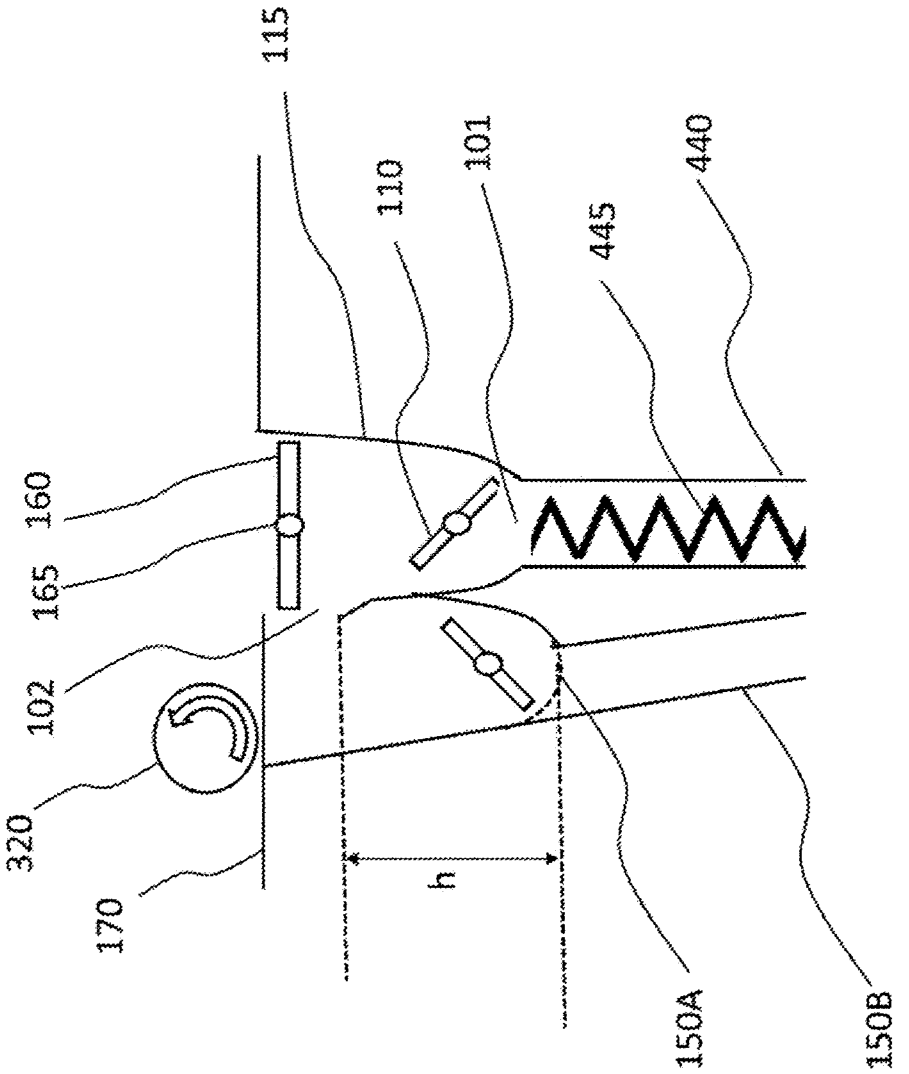

The greatest distance through which excess powder drops from the outlet 102 of the powder repository 115 into the recirculating tube 150A is denoted by "h" in FIGS. 20 and 21.

More particularly, as illustrated in FIG. 20, "h" is the greatest drop between the outlet 102 of the powder repository 115 and the base 150A' of the shallow angle section 150A of the recirculating tube—i.e. the greatest drop through which excess powder falls. When designing the arrangement of the two-section recirculating tube, the angle of the shallow section 150A (X in FIG. 19) should be such as to minimise the distance h, whilst still enabling the powder to flow along the tube.

FIG. 21 shows in more detail where the drop "h" is measured. As illustrated, the drop "h" is measured from the upper edge of the outlet 102 over which the excess powder flows.

The above-described modifications to the recirculating tube 150 may also be applied to the return tube 220. As discussed above, the return tube 220 may comprise an upper return tube 220A having a shallow angle, and a lower return tube 220B having a steeper angle. The shallow angle of the upper return tube 220A is such as to minimise the generation of powdery dust as powder falls through the return slot 210, by reducing the height of the drop through which the powder falls.

Further objects, features and advantages of this invention will become readily apparent to persons skilled in the art after review of the following description, including the claims, and with reference to the drawings that are appended to and form a part of this specification.

The invention claimed is:

1. A method for recirculating powder in an apparatus for manufacturing a three-dimensional object from powder, the apparatus including a work surface having a build area, the method comprising, during layer deposition and pattern formation for the object:

(a) providing powder in a powder repository, wherein said powder in the powder repository is one of powder provided from a powder tank, excess powder recirculated in the apparatus, or a blend of powder from the powder tank and excess powder;

(b) transferring the powder from the powder repository to the work surface;

(c) distributing the powder across the build area to form a layer and resulting in a portion of the powder defining excess powder;

(d) returning, following each layer formation, the excess powder from the work surface back to the powder repository;

(e) delivering powder from the powder tank to the powder repository when the amount of powder in the powder repository is less than the predetermined amount of powder, and not delivering powder from the powder tank to the powder repository when excess powder returned to the powder repository is sufficient so that the amount of powder in the powder repository is greater than the predetermined amount of powder; and (f) repeating (a) to (e) for each layer until the object is complete.

2. The method according to claim 1, further comprising heating the excess powder while returning the excess powder.

3. The method according to claim 1, further comprising agitating the excess powder while returning the excess powder.

4. The method according to claim 1, further comprising agitating the powder during the step of delivering the powder from the powder tank to the powder repository.

5. The method according to claim 1, further comprising agitating powder within the powder repository.

6. The method according to claim 1, further comprising agitating powder in the powder tank.

7. The method according to claim 1, further comprising recirculating powder from the powder repository by removing powder via an outlet of the powder repository so as to keep a level of powder in the powder repository constant, said removed powder defining a recirculated powder, combining said removed powder with excess powder and/or powder from the powder tank to form combined powder, and feeding the combined powder back to the powder repository, such that said powder in the powder repository further comprises recirculated powder.

8. The method according to claim 7, wherein returning and recirculating comprises combining the recirculated powder and the excess powder before feeding the combined powder back to the powder repository.

9. The method according to claim 1, wherein returning comprises returning the excess powder along a delivery path to the powder repository and delivering powder from the powder tank comprises delivering powder from the powder tank along the delivery path to the powder repository.

10. The method according to claim 9, wherein the powder from the powder tank is delivered to the delivery path at a location downstream of the excess powder being delivered to the delivery path.

11. The method according to claim 10, further comprising recirculating powder from an outlet of the powder repository to the delivery path, said powder defining a recirculated powder, the recirculated powder being delivered to the delivery path at a location downstream of the excess powder being delivered to the delivery path.

12. The method according to claim 11, wherein the recirculated powder is delivered to the delivery path at a location upstream of the powder from the powder tank being delivered to the delivery path.

13. The method according to claim 12, wherein the recirculated powder is delivered to the delivery path at a location concurrently with the powder from the powder tank being delivered to the delivery path.

14. The method according to claim 1, further comprising prioritizing returning of the excess powder to the powder repository over delivering powder from the powder tank to the powder repository.

15. The method according to claim 1, further comprising recirculating powder from the powder repository by removing powder via an outlet of the powder repository to the powder repository so as to keep a level of powder in the powder repository constant, said removed powder defining a recirculated powder, and further comprising prioritizing the returning of the excess powder to the powder repository over the feeding of the recirculated powder back to the powder repository.

16. The method according to claim 1, further comprising recirculating powder from the powder repository by removing powder via an outlet of the powder repository to the powder repository so as to keep a level of powder in the powder repository constant, said removed powder defining a recirculated powder, and further comprising prioritizing the feeding the recirculated powder back to the powder repository over the delivering of powder from the powder tank to the powder repository.

17. A method for recirculating powder in an apparatus for manufacturing a three-dimensional object from powder, the apparatus including a work surface having a build area, the method comprising, during layer deposition and pattern formation for the object:

(a) providing powder in a powder repository, wherein said powder in the powder repository is one of powder provided from a powder tank, recirculated powder recirculated in the apparatus, or a blend of powder from the powder tank and recirculated powder;

(b) flowing powder in the powder repository into an outlet of the powder repository so as to keep a level of powder in the powder repository constant, said removed powder defining a recirculated powder;

(c) transferring powder from the powder repository to the work surface and distributing the powder across the build area to form a layer;

(d) returning the recirculated power to the powder repository, (e) continuously repeating steps (a) through (e) for each layer until the object is complete; wherein, for at least some of the layers, step (d) comprises combining the recirculated powder with powder from the powder tank to form combined powder, and returning the combined powder to the powder repository, such that said powder in the powder repository further comprises recirculated powder.

* * * * *